(12) United States Patent
Richards et al.

(10) Patent No.: US 8,338,558 B2
(45) Date of Patent: Dec. 25, 2012

(54) POLYURETHANE BASED PIGMENT DISPERSANTS WHICH CONTAIN REACTIVE DOUBLE BONDS

(75) Inventors: Stuart N. Richards, Frodsham (GB); Andrew J. Shooter, Altrincham (GB)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 736 days.

(21) Appl. No.: 11/916,661

(22) PCT Filed: Jun. 1, 2006

(86) PCT No.: PCT/US2006/021250
§ 371 (c)(1),
(2), (4) Date: Dec. 6, 2007

(87) PCT Pub. No.: WO2006/132910
PCT Pub. Date: Dec. 14, 2006

(65) Prior Publication Data
US 2008/0227945 A1    Sep. 18, 2008

Related U.S. Application Data

(60) Provisional application No. 60/688,011, filed on Jun. 7, 2005.

(51) Int. Cl.
*C08G 18/32* (2006.01)
*C08G 18/42* (2006.01)
*C08G 18/48* (2006.01)
*C08G 18/62* (2006.01)
*C08G 18/65* (2006.01)

(52) U.S. Cl. ............ 528/49; 528/71; 528/75; 528/76; 528/80; 528/85

(58) Field of Classification Search ............ 528/49, 528/71, 75, 76, 80, 85
See application file for complete search history.

(56) References Cited

U.S. PATENT DOCUMENTS

| 4,762,902 | A |   | 8/1988 | Murphy |   |
| 4,764,553 | A | * | 8/1988 | Mosbach et al. | 524/591 |
| 4,794,147 | A | * | 12/1988 | Savino et al. | 525/127 |
| 4,942,213 | A |   | 7/1990 | Haubennestel et al. |   |
| 7,741,404 | B2 | * | 6/2010 | Richards et al. | 524/589 |
| 2002/0156145 | A1 |   | 10/2002 | Van Den Berg et al. |   |
| 2004/0260013 | A1 | * | 12/2004 | Richards | 524/589 |

FOREIGN PATENT DOCUMENTS

| EP | 0 424 705 A2 |   | 5/1991 |
| WO | WO 03/046038 A1 | * | 6/2003 |

\* cited by examiner

*Primary Examiner* — Rabon Sergent
(74) *Attorney, Agent, or Firm* — Samuel B. Laferty

(57) ABSTRACT

Polymeric urethane dispersants with solubilizing polymer chains and with reactive carbon to carbon double bonds are described. The reactive double bonds facilitate molecular weight build-up of the dispersant on dispersed particles (enhancing colloidal stability) or enhance the ability of the dispersants to be crosslinked into a matrix material.

18 Claims, No Drawings

POLYURETHANE BASED PIGMENT DISPERSANTS WHICH CONTAIN REACTIVE DOUBLE BONDS

This application claims priority from PCT Application Serial No. PCT/US2006/021250 filed on Jun. 1, 2006, which claims the benefit of U.S. Provisional Application No. 60/688,011 filed on Jun. 7, 2005.

FIELD OF INVENTION

The invention relates to the polyurethane dispersants with carbon to carbon double bonds themselves and to their use for dispersing particles (e.g., pigments) in liquid media. In the first embodiment, once the dispersion of particles has been made, the dispersants may be crosslinked with a suitable crosslinking agent (e.g., polyamine or via free radicals) to lock them onto the particle surface. Alternatively, the dispersions may be utilized in coatings, inks or other formulations where the binder material contains reactive unsaturation which is cured after the addition of the dispersion. The polyurethanes may have linear or non-linear backbones.

BACKGROUND OF THE INVENTION

U.S. Pat. No. 3,393,162 to ICI titled Block and Graft Copolymer Dispersants claims a process for coating solid particles with organic polymeric material including the steps of dispersing said particles in a liquid containing block and/or graft copolymers, said copolymers comprising polymeric components of different degrees of polarity, varying the polarity of the liquid to precipitate at least one but not all of said polymeric components on said particles, whereas said block and/or graft copolymers thereafter function as a dispersion stabilizer for the particles.

U.S. Pat. No. 6,262,152 to E. I. du Pont discloses dispersions containing a liquid vehicle (which can be aqueous, semi-aqueous), organic or inorganic particles (or mixtures) that are insoluble in the liquid vehicle and a polymeric dispersant, having improved stability when the insoluble segment(s) contains cross-linking groups which are cross-linked to itself or a cross-linking compound to form an encapsulated network that entraps the particles, which are particularly useful for paints or inks in coating and printing applications.

SUMMARY OF THE INVENTION

Polyurethane dispersants with on average at least one reactive carbon to carbon double bond per molecule can be made. They are useful in making dispersants that either a) form more stable dispersions due to chain extension/crosslinking reactions (by Michael addition reaction with a polyamine or by free radical mechanisms) of the dispersants after said dispersants have adsorbed themselves on a particle surface or b) can be free radically crosslinked into various binders or continuous phases if such binders/continuous phases are reactive with carbon to carbon double bonds.

DETAILED DESCRIPTION OF THE INVENTION

Dispersants containing reactive carbon to carbon double bonds serve to solve problems in 2 areas. Dispersants with reactive carbon to carbon double bonds can co-cure with unsaturated binder systems e.g., sheet or bulk molding compounds or radiation cure systems (UV or electron beam). Use of a conventional dispersant in coatings, inks or resin systems (e.g., sheet molding compounds) which cure through polymerization after application can lead to a reduction in performance of the coating or article. As normally the dispersant is a non-reactive component in the curing system, it may (i) serve to extend cure time, (ii) lead to softening or plasticisation of the final film (iii) potentially be exuded from the final film which may manifest itself as blooming. The presence of reactive double bonds within the dispersant of this disclosure enables the dispersant to be incorporated and bonded into the cured matrix during polymerization thereby reducing or eliminating the negative effects of the conventional dispersant.

The stability of pigment dispersions with conventional dispersants can be adversely affected by changes in conditions e.g., when the pigment dispersion is letdown into the coating composition or if it experiences elevated temperatures or a change to a different solvent mixture. Introduction of other pigments or particulate matter may also cause preferential adsorption of the dispersant by a second pigment source leading to destabilization of the original pigment dispersion due to dispersant depletion from the initial pigment.

Conventional dispersants adsorb onto pigment surface and an equilibrium is established with free dispersant in continuous phase. For a pigment dispersant to remain effective in providing a steric and/or electrostatic barrier to flocculation the conventional dispersant must remain substantially adsorbed to the pigment. The equilibrium position can be affected by change in temperature, change in solvent, etc. The strength of the adsorption (i.e., equilibrium position between free and adsorbed dispersant) will also vary depending on the nature of the pigment.

Although not wishing to be bound to any specific mode of action, the following schematic illustration is included to help explain the problem.

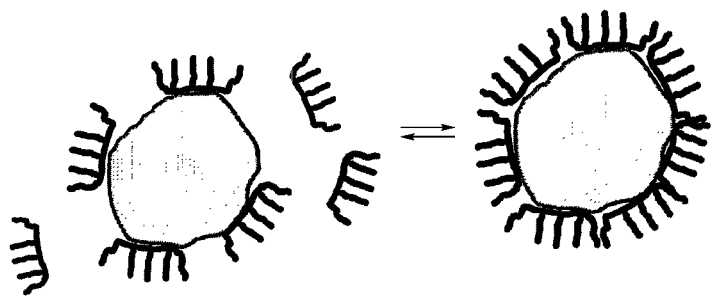

If the dispersant can be crosslinked or chain extended to a higher molecular weight after adsorption to the pigment surface, it will then be locked in place or become less soluble in the continuous phase and therefore much less able to desorb. Therefore, the stability of the pigment dispersion is much less prone to be adversely affected by the changes in environment (vehicle composition, temperature, etc.) as discussed above.

Polyurethane based dispersants enable ready incorporation of reactive double bonds in a simple single stage, single pot reaction. The reactive double bonds can either co-cure with a reactive binder system or react with external crosslinkers such as polyamines to form an encapsulated network thereby offering flexibility in dispersant design and application area.

EMBODIMENT 1

One embodiment of this invention involves modification of dispersants having laterally attached solubilizing side chains and essentially linear polyurethane backbones to contain one or more carbon to carbon double bonds. These are shown in the following schematic representations where circles represent repeating units from monomer and the wiggly lines represent either lateral solubilizing side polymer chains or terminal solubilizing chains. X' represents optional acid or amino groups ("c") described later. The first figure represents a polyurethane dispersant without any carbon to carbon double bonds.

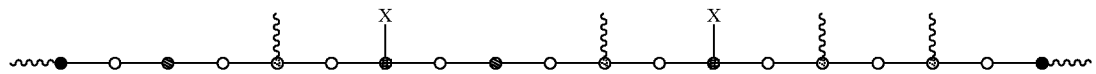

○ Residue of diisocyanate

◉ Residue of difunctional formative compound (component d)

⊕-X Residue of acid or amino functional compound

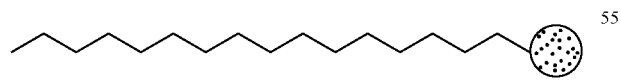

Residue of lateral solubilising polymer chain with two isocyanate reactive groups at one end of the chain (component b)

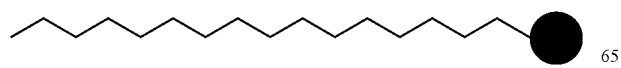

Residue of monofunctional chain terminator which is polymeric in nature (component e)

The reactive double bond can be incorporated in several ways either at a) end of solubilizing chain or b) from monomeric species or combinations. Three possibilities from a plethora of possible structures are shown below.

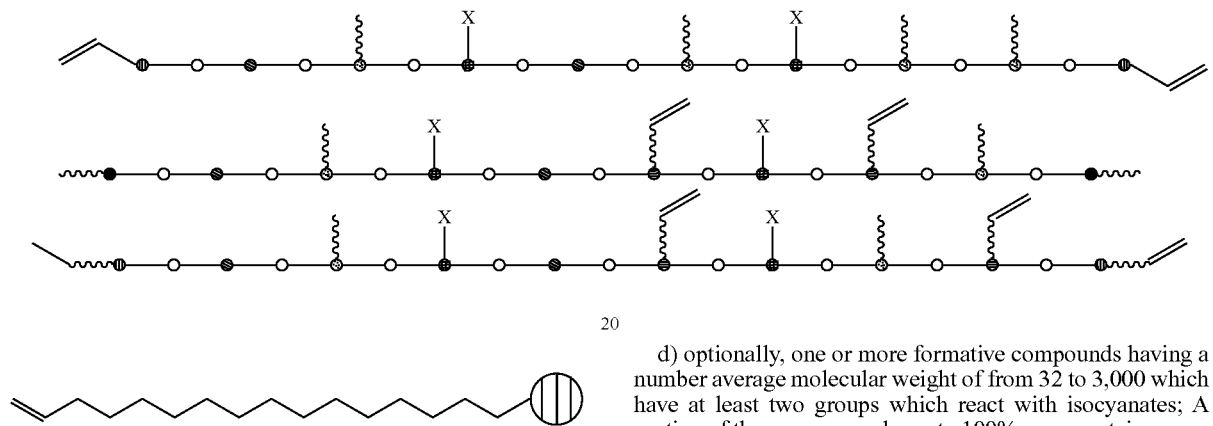

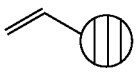

Residue of monofunctional chain terminator which is polymeric in nature and contains a carbon to carbon double bond (component e)

Residue of monofunctional chain terminator which is monomeric in nature and contains a carbon to carbon double bond (component e)

Residue of lateral solubilising polymer chain with two isocyanate reactive groups at one end of the chain and contains a carbon to carbon double bond at the other end (component b)

Embodiments 1, 2, and 3 are similar in that all have a polyurethane backbone and solvent solubilizing chains. Embodiment 1 differs from embodiments 2 and 3 in that most of the urethane forming monomers are monofunctional or difunctional (rather than tri or higher functionalities) such that the polymer backbone (defined as the molecules directly between the reactive groups of each difunctional monomer) is a linear backbone. The laterally attached side chains (solubilizing chains) in this embodiment are chemically bound as a side chain to the initial monomer and thus are lateral side chains to the polyurethane backbone when it is formed. The polyurethane dispersants of embodiment 1 may be prepared by any polyurethane synthesis method known to the art and are readily obtainable or obtained by reacting together:

a) one or more polyisocyanates having an average functionality of from 2.0 to 2.5;

b) one or more compounds (solvent-solubilizing) having at least one polyester, polyether, polyacrylate or polyolefin chain and at least two groups which react with isocyanates which are located at one end of the compound such that the polyester, polyether or polyacrylate chain(s) is laterally disposed in relation to the polyurethane polymer backbone; A portion of these chains, up to 100%, may contain one or more carbon to carbon double bonds.

c) optionally, one or more compounds having an acid or amino group, including salts thereof, and at least two groups which react with isocyanates;

d) optionally, one or more formative compounds having a number average molecular weight of from 32 to 3,000 which have at least two groups which react with isocyanates; A portion of these compounds, up to 100%, may contain one or more carbon to carbon double bonds.

e) optionally, one or more compounds which act as polyurethane chain terminators which contain one group which reacts with isocyanates; A portion of these compounds, up to 100%, may contain one or more carbon to carbon double bonds.

f) optionally, one or more compounds which act as chain terminators which contain a single isocyanate group. A portion of these compounds, up to 100%, may contain one or more carbon to carbon double bonds.

As noted hereinbefore, the polyurethane dispersants of embodiment 1 have an essentially linear backbone and consequently it is much preferred that components (b), (c) and (d) contain only two groups which react with isocyanates. It is also preferred that component (a) has a functionality of from 2.1 to 2.0 and especially about 2 since this also limits any cross-linking/branching between chains of the polyurethane dispersants.

Double bonds can be present in any or all of the components (b), (d), (e) or (f). It is essential for the invention that double bonds are present in at least one of these components.

It is preferred that the average functionality of carbon to carbon double bonds in the dispersant molecule is at least one. It is especially preferred that the average functionality of double bonds in the dispersant molecule is at least about two.

It is preferred in some embodiments that component (f) is absent.

It is preferred that double bond(s) are present in (b) and/or (d) and/or (e). It is especially preferred that the double bonds are present in component (e).

It is preferred that the double bond or bonds in component (b), if present, are located at the opposite end of the chain to the isocyanate reactive groups.

It is preferred that the double bonds present in the dispersant are reactive in polymerization with other unsaturated components used in reactive coatings such as radiation curable coatings and inks or sheet molding compounds. The double bonds present in the dispersant should therefore copolymerize with monofunctional and polyfunctional (meth) acrylate monomers and oligomers and styrenic monomers.

It is preferred that the double bonds present in the dispersant are activated towards the addition of primary and secondary amines.

It is preferred that the double bonds present in the dispersant are present in methacrylate or acrylate ester functionalities. It is especially preferred that they are present in acrylate esters.

Examples of materials for component (e) that contain one or more double bonds are of two types.

1) Monomeric.

It is preferred that the isocyanate reactive group is hydroxy.
Examples include hydroxyethyl acrylate, hydroxypropyl acrylate, pentaerythritol triacrylate, hydroxyethyl methacrylate, hydroxypropyl methacrylate, allyl alcohol.

2) Polymeric.

Polymeric Types Include i) Polalkylene glycol acrylates (and methacrylates). Example of general structure shown for PEG/PPG (alk)acrylate.

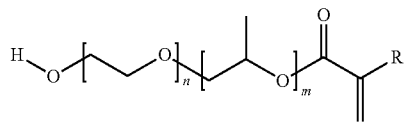

where R=H or alkyl. R is preferably H or methyl. R is especially preferred to be H.

Several grades are commercially available e.g., from Cognis.

n+m=2 to 100, preferred 3 to 50, especially 5 to 50 ii) Monohydroxy polyester (meth)acrylates.

A specific example for illustrative purposes of a monohydroxy polyester (meth)acrylate is obtained from polymerization of ε-caprolactone in the presence of hydroxyethyl acrylate.

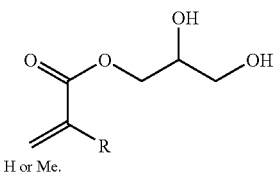

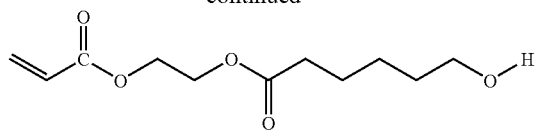

Examples of materials for component (d) that contain one or more double bonds are glycerol acrylate and glycerol methacrylate.

One method used for generating materials of component b which contain a double bond is to react a monohydroxy polymer chain containing a carbon to carbon double bond onto a diisocyanate with differential reactivity of the two isocyanates groups (such as 2,4-TDI) and then react that adduct with a dialkanolamine such as diethanolamine to generate the dihydroxy adduct. The reactivity of the carbon to carbon double bond towards Michael addition of the amine is desirably such as to compete significantly with the addition of the amine to the isocyanate residue. An illustrative example shows the reaction for a (meth)acrylate ended monohydroxy polylactone chain. The desired product together with the potential undesired product are illustrated. The desired reaction will be more favoured for methacrylate functional chains (with R=Me) in the following scheme.

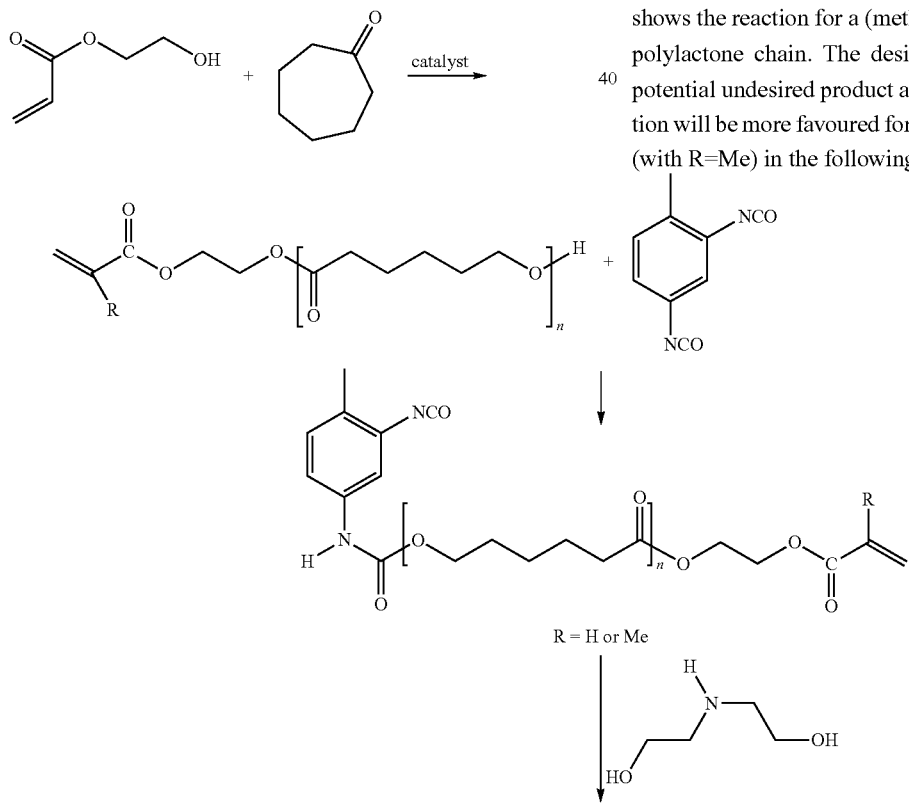

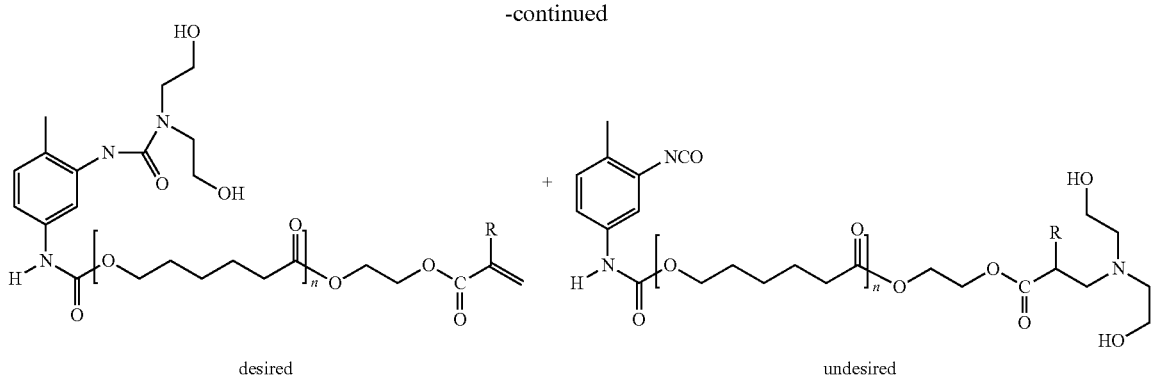

desired          undesired

Another way a (meth)acrylate functionality could be introduced is to use a modification of the method described in EP43966.

In EP43966 compounds of the general formulae

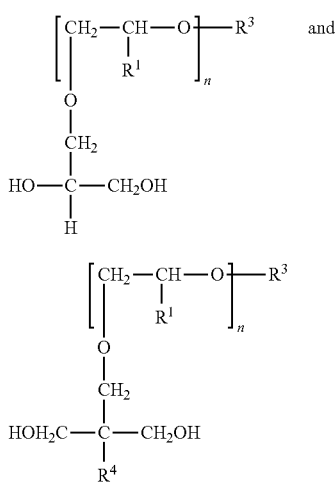

are disclosed.

From a translation of the original German patent $R^3$ is described as follows $R^3$ is a protective group optionally removable again by cleavage. This is introduced before the acetal or ketal cleavage, by reacting the hydroxyl group with a compound which is monofunctional and has a group reactive towards the hydroxyl group. Here, the reaction can take place by substitution or addition. An example of a substitution reaction is the reaction of the hydroxyl group with an alkyl halide, e.g., methyl chloride, or an alkyl aryl halide, e.g., benzyl chloride, wherein the hydrocarbon residue can have 1 to 12 carbon atoms. An example of a suitable addition reaction is the reaction of the hydroxyl group of the polyether with an organic monoisocyanate, e.g., an alkyl or aryl monoisocyanate, or a vinyl compound, e.g., acrylonitrile, methyl acrylate or methyl vinyl ketone.

The blocking of the free hydroxyl group on the opposite polyether chain end to the starting alcohol can however be effected under conditions such that, if desired, the protective group can be cleaved off again. Thus, for example, it is possible to esterify the hydroxyl group with an organic monocarboxylic acid or an acid chloride. Corresponding esterifications are also possible with other acids, e.g., sulphonic acid. After the cleavage of the ketal or acetal group and after the polymerization of the 1,2 or 1,3-diol formed, the end-blocking ester group can be removed by saponification.

A preparation is therefore illustrated by the following scheme

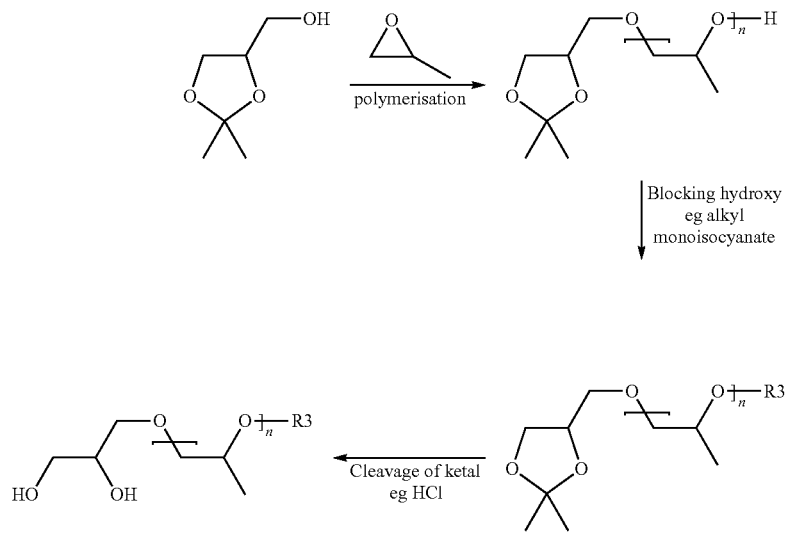

If the blocking of the hydroxy group were carried out with (meth)acryloyl chloride or an isocyanoto(meth)acrylate, then a (meth)acrylate ended material would be realized.

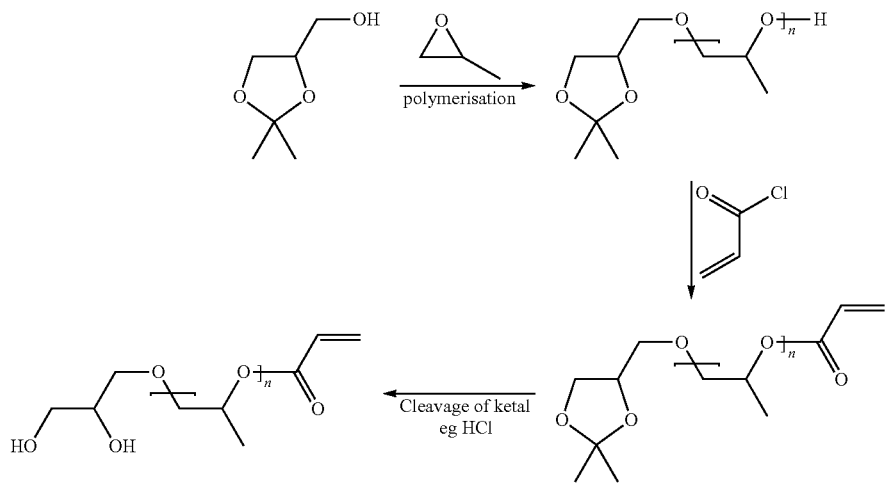

Methacryloyl chloride may also be used in place of acryloyl chloride to generate a methacrylate functionality.

The preparation of the polyurethane polymer/prepolymer may be carried out in the presence of a catalyst. Particularly preferred catalysts are tin complexes of aliphatic acids such as dibutyl tin dilaurate (DBTDL) and tertiary amines.

The preparation of the polyurethane polymer/prepolymer is carried optionally in the presence of a polymerization inhibitor such as hydroquinone or butylated hydroxy toluene.

The preparation of the polyurethane polymer/prepolymer may be carried out in an inert atmosphere, which may be provided by any of the inert gases of the Periodic Table, but is preferably nitrogen. The preparation of the polyurethane polymer/prepolymer may also be carried out under an atmosphere of air to assist inhibition of the polymerization of reactive carbon to carbon double bonds present. When the presence of oxygen is desired to assist inhibition of the polymerization of reactive carbon to carbon double bonds present, but flammability of the polymerizing mixture is a concern the preparation may be carried out under an atmosphere of depleted oxygen which typically contains 1-10% oxygen.

The essential feature of the polyurethane polymer according to embodiment 1 is that it comprises a predominantly linear polyurethane polymer backbone containing defined amounts of lateral polymeric side chains (solvent solubilizing) which may be poly(alkylene oxide), polyester, poly(alk)acrylate or polyolefin. There will thus be many variants which will be obvious to the skilled addressee regarding the ratio of isocyanate groups to isocyanate reactive groups including the formulation of prepolymers which have residual isocyanate functionality. In one case, the ratio of total isocyanate groups provided by component (a) is less than the total number of isocyanate reactive groups provided by component (b) and components (c) (d) and (e) when present. Any terminal isocyanate reactive groups may be reacted.

Whereas, the polyester, polyether, polyacrylate or polyolefin chains may contain a terminating hydroxy group remote from the polyurethane backbone it is much preferred that such chains carry a [terminating] group which is not reactive with isocyanates since this restricts any cross-linking during the preparation of the dispersant. The terminating group remote from the polyurethane backbone may contain a carbon to carbon double bond otherwise it is preferred that it is a $C_{1-50}$-hydrocarbyl group. The hydrocarbyl group may be optionally branched alkyl, cycloalkyl, aryl or aralkyl. In some aspects, it is desirable that the hydrocarbyl group contain one or more carbon to carbon double bonds. The cycloalkyl group is preferably $C_{3-6}$-cycloalkyl such as cyclopropyl and especially cyclohexyl. The aryl group is preferably $C_{6-10}$-aryl such as naphthyl and especially phenyl which may be substituted by halogen, $C_{1-20}$-alkyl or $C_{1-20}$-alkoxy. The aralkyl group is preferably 2-phenylethyl and especially benzyl where the phenyl ring is optionally substituted by halogen, $C_{1-20}$-alkyl or $C_{1-20}$-alkoxy. The hydrocarbyl group here and elsewhere in this disclosure is desirably substantially hydrocarbon but in some aspects up to 1, 2, or 3 oxygen, nitrogen, or sulfur atoms may be present for every 10 carbon atoms.

The length of the alkyl terminating group of the polyester, polyether, polyacrylate, or polyolefin chain depends to a large extent on the nature of the organic medium. Thus, for example, when the vehicle is a polar organic liquid, the hydrocarbyl group is preferably $C_{1-12}$-alkyl which may be linear or branched. The hydrocarbyl group includes ethyl, propyl, isopropyl or mixtures thereof. When the polyurethane dispersant contains polyether side chains it is preferred that the terminating alkyl group is $C_{1-4}$ alkyl, for instance methyl, because of their ready commercial availability. When the vehicle is a non-polar organic liquid it is preferred that the terminating alkyl group contains greater than 8 carbon atoms. It is also preferred that the alkyl group is branched since this aids solubility in the non-polar organic liquid.

The alkylene moiety of the ($C_{2-4}$-alkylene oxide) group may be linear or preferably branched and may be obtained by (co)polymerization of alkylene oxides such as ethylene oxide, propylene oxide and butylene oxide or from tetrahydrofuran. Copolymers may be random or block copolymers.

The polyester chain is preferably obtainable or obtained from a hydroxy carboxylic acid containing from 1 to 26 carbon atoms or a lactone thereof. The choice of hydroxy carboxylic acid is largely influenced by the nature of the organic medium itself. Where the vehicle is a polar organic liquid, the hydroxy carboxylic acid preferably contains up to 8 carbon atoms and where the vehicle is a non-polar organic liquid the hydroxy carboxylic acid preferably contains more than 8 carbon atoms. It is particularly preferred that the polyester chain is obtainable from two or more different hydroxy carboxylic acids or lactones thereof since this aids solubility in the organic medium. The hydroxy carboxylic acid may be saturated or unsaturated, linear or branched.

Examples of suitable hydroxy carboxylic acids are glycolic acid, lactic acid, 5-hydroxy valeric acid, 6-hydroxy caproic acid, ricinoleic acid, 12-hydroxy stearic acid, 12-hydroxydodecanoic acid, 5-hydroxydodecanoic acid, 5-hydroxydecanoic acid and 4-hydroxydecanoic acid. Examples of suitable lactones are β-propiolactone and optionally C1-6-alkyl substituted δ-valerolactone and ε-caprolactone such as β-methyl-δ-valerolactone; δ-valerolactone; ε-caprolactone; 2-methyl, 3-methyl, 4-methyl, 5-tert butyl, 7-methyl-, 4,4,6-trimethyl-, and 4,6,6-trimethyl-ε-caprolactone; including mixtures thereof. Polyester chains derivable from δ-valerolactone and ε-caprolactone are especially preferred.

The polyacrylate chains are preferably obtainable or obtained by (co)polymerizing $C_{1-6}$-(alk)acrylate esters (where "(alk)" means optionally substituted with a $C_{1-C6}$ alkyl on the double bond) and especially (meth)acrylate esters (e.g. polymers from acrylic acid (optionally $C_{1-6}$ alkyl substituted) or esters from $C_{1-18}$ (more preferably $C_{1-8}$) alcohols and acrylic or $C_{1-6}$ alkyl substituted acrylic acid).

As disclosed hereinbefore, the polyurethane dispersants may contain mixtures of polyester, polyether, polyacrylate, and polyolefin solvent-solubilizing chains.

By way of an obvious variant, the polyester, polyether, polyacrylate, and polyolefin solvent solubilizing chains may themselves be mixtures of such chains. Thus, for example, the polyester and polyacrylate side chains may contain a polyether moiety and so on.

The number-average molecular weight of the solvent-solubilizing polyester, polyether, polyacrylate, or polyolefin chains in the polyurethane dispersant is preferably not greater than 10,000, more preferably not greater than 4,000 and especially not greater than 2,500. It is also preferred that the number-average molecular weight of the lateral polyester, polyether and polyacrylate chains is not less than 300, more preferably not less than 600 and especially not less than 800.

The lateral side chain polyester, polyether, polyacrylate or polyolefin chains in embodiment 1 are connected to polyurethane backbone by oxygen and/or nitrogen atoms which are the residue of terminating hydroxy and amino (primary and secondary) groups of the polyester, polyether, polyacrylic (especially polyacrylate) or polyolefin.

When the lateral side chain is a polyether of embodiment 1, it is preferably the residue of a polyether which contains either two hydroxyl groups or one hydroxyl and one secondary amino group (both predominantly at one end of the lateral side chain) which react with isocyanates. The hydroxyl and/or amino groups are preferably separated from each other by up to 6 carbon atoms. In one embodiment, when the polyether contains two hydroxyl groups which react with isocyanates, they are preferably separated by up to 17 atoms, especially 16 carbon atoms and one nitrogen atom. It is also preferred that the two hydroxyl groups are separated by not less than 5 atoms, especially 4 carbon atoms and one nitrogen atom. It is also possible to prepare the dispersant from a polyether which contains two amino groups (i.e., primary and/or secondary amino groups) which react with isocyanates but this is less preferred.

When the lateral side chain of embodiment 1 is a polyester, it is preferably the residue of the polyester which contains two hydroxyl groups at one end of the polyester chain which react with isocyanates. The hydroxyl groups are also preferably separated by up to 17 atoms, especially 16 carbon atoms and one nitrogen atom. It is especially preferred that the two hydroxyl groups are separated by not less than 5 atoms.

When the lateral side chain is a polyacrylate of embodiment 1, it is preferably the residue of a polyacrylate which contains two hydroxy groups at one end of the polyacrylate chain which react with isocyanates. The two hydroxyl groups are preferably separated by up to 4 carbon atoms, for example, 2 carbon atoms. In one embodiment, the polyacrylate is present and in another embodiment the polyacrylate is absent.

When the lateral side chain of embodiment 1 is a polyolefin, it is preferably the residue of a polyolefin which contains either two hydroxyl groups or one hydroxyl and one secondary amino group which react with isocyanates at one end of the polyolefin chain. The hydroxyl and amino groups are preferably separated by up to 6 carbon atoms. When the polyolefin contains two hydroxyl groups which react with isocyanates, they are preferably separated by up to 17 atoms, especially 16 carbon atoms and one nitrogen atom. It is also preferred that the two hydroxyl groups are separated by not less than 5 atoms, especially 4 carbon atoms and one nitrogen atom. It is also possible to prepare the dispersant from a polyolefin which contains two amino groups (i.e., primary and/or secondary amino groups) which react with isocyanates but this is less preferred.

The dispersant may also optionally contain an acid and/or amino group, including salts thereof, since such groups have been found to improve the dispersability of some particulate solids. The amount of acid and/or amino groups in the polyurethane dispersant is preferably from 10 to 180, more preferably from 20 to 110, and especially from 20 to 60 milliequivalents for each 100 g polyurethane dispersant. It is preferred that the dispersant contains acid and/or amino groups. For acid, it is preferred that these are carboxylic acid. For amino groups, it is preferred that these are tertiary or aromatic.

When the acid group is in the form of a salt, it may be the salt of an alkali metal such as sodium, potassium or lithium, a salt of an amine such as $C_{1-8}$-alkylamine or $C_{1-8}$-alkanolamine or a salt of a quaternary ammonium cation such as a $C_{1-8}$-alkyl quaternary ammonium cation or benzalkonium cation. The amino group may be quaternised. This may be achieved, for example, by reaction with a dialkyl sulphate, such as dimethyl sulphate or benzyl chloride. Preferably, the acid group, when present, is in the form of the free acid.

When the amino group is in the form of a salt, it may be the salt of an inorganic or organic acid. Examples of such acids are inorganic acids such as hydrochloric acid and organic acids such as those containing carboxylic acid group(s) (e.g., acetic acid), sulphonic acid group(s) or phosphonic acid groups. Preferably, the amino group, when present, is in a non-ionized form.

The polyurethane dispersant may in addition to lateral side chains also have terminal solvent solubilizing polyester, polyether, polyacrylate or polyolefin chains. Such chains are similar to those described hereinbefore for the lateral chains but are obtainable from compounds having only the one group which reacts with isocyanates. The solvent-solubilizing chains with one reactive group are used extensively in embodiments 2 and 3.

The total weight percentage of the solvent-soluble lateral and terminal chains in the polyurethane dispersant is preferably not less than 20%, more preferably not less than 30% and especially not less than 40%. The solvent soluble lateral and terminal chains are similar in that both types are primarily chemically bonded to the polymer backbone at one end of the chains and thus the non-bonded end of the chain has significant mobility to extend into the solvent phase. It is also preferred that the total weight percentage of solvent-soluble lateral and terminal chains in the polyurethane dispersant is not greater than 90%, more preferably not greater than 80%, for instance 45% to 80% or 60% to 78%. In one embodiment, the total weight percentage of solvent-soluble lateral and terminal chains in the polyurethane dispersant is not greater than 70%, for instance 55% to 65%.

The weight percentage of solvent-soluble lateral chains in the polyurethane dispersant is preferably not less than 5%, more preferably not less than 15% and especially not less than 25% or not less than 35%.

General Uses of Dispersant

According to the invention, there is provided a non-aqueous composition comprising a particulate solid, an organic medium and a polyurethane dispersant having an essentially linear backbone with laterally attached solvent-solubilizing side chains of a polyester, a polyacrylic, a polyether or a polyolefin including mixtures of such side chains. The polyurethane dispersant is further characterized in that it also comprises on average at least one group containing carbon to carbon double bonds (unsaturation). The groups containing the carbon carbon double bonds may be incorporated such that they are part of the vehicle soluble chains or vehicle insoluble portion(s) of the dispersant. The vehicle soluble or the vehicle insoluble portion of the dispersant can be close to the backbone or pendant from the backbone, depending on the vehicle and particle system chosen. In this disclosure, vehicle will refer to the continuous phase in which the particulate is dispersed. It may be water, organic solvents or blends thereof. In some preferred embodiments, the vehicle soluble portions of the dispersant extend from the dispersant backbone into the vehicle phase.

The invention also includes the dispersant materials themselves as well as the composition in which they are used such as a coating, ink or molding compound. According to the invention, there is provided a non-aqueous composition comprising a particulate solid, an organic medium and a polyurethane dispersant (in embodiment 1 having an essentially linear backbone with laterally attached solvent solubilizing side chains) of polyester, polyacrylic (especially a polyacrylate), polyether or polyolefin including mixtures of such side chains (embodiment 1) or essentially non-linear backbone with solvent-solubilizing side chains at the termini and optionally laterally attached (embodiments 2 and 3). The optimum choice of the solvent solubilizing side chain will be dependent on the polarity of the vehicle (e.g., organic medium). In one embodiment, the polyolefin is present and in another embodiment the polyolefin is absent.

In one embodiment where non-aqueous vehicle is desirable, the vehicle optionally contains 5 wt. % or less water, preferably less than 2 wt. %, more preferably less than 0.5 wt. % and most preferably no water.

The particulate solid present in the composition may be any inorganic or organic solid material which is substantially insoluble in the organic medium at the temperature concerned and which it is desired to stabilise in a finely divided form therein.

Examples of suitable solids are pigments for solvent inks; pigments, extenders and fillers for paints and plastics materials; dyes, especially disperse dyes; optical brightening agents and textile auxiliaries for solvent dyebaths, inks and other solvent application systems; solids for oil-based and invert-emulsion drilling muds; dirt and solid particles in dry cleaning fluids; particulate ceramic materials; magnetic materials and magnetic recording media, fire retardants such as those used in plastics materials and biocides, agrochemicals and pharmaceuticals which are applied as dispersions in organic media.

A preferred particulate solid is a pigment from any of the recognised classes of pigments described, for example, in the Third Edition of the Color Index (1971) and subsequent revisions of, and supplements thereto, under the chapter headed "Pigments". Examples of inorganic pigments are titanium dioxide, zinc oxide, Prussian blue, cadmium sulphide, iron oxides, vermilion, ultramarine and the chrome pigments, including chromates, molybdates and mixed chromates and sulphates of lead, zinc, barium, calcium and mixtures and modifications thereof which are commercially available as greenish-yellow to red pigments under the names primrose, lemon, middle, orange, scarlet and red chromes. Examples of organic pigments are those from the azo, disazo, condensed azo, thioindigo, indanthrone, isoindanthrone, anthanthrone, anthraquinone, isodibenzanthrone, triphendioxazine, quinacridone, perylene, diketopyrrolopyrrol (DPP), and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. Preferred organic pigments are phthalocyanines, especially copper phthalocyanines, monoazos, disazos, indanthrones, anthranthrones, quinacridones, perylene, diketopyrrolopyrrol (DPP), and carbon blacks.

Other preferred particulate solids are: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g., gamma-$Fe_2O_3$, $Fe_3O_4$, and cobalt-doped iron oxides, calcium oxide, ferrites, especially barium ferrites; and metal particles, especially metallic iron, nickel, cobalt and alloys thereof; agrochemicals such as the fungicides flutriafen, carbendazim, chlorothalonil and mancozeb and fire retardants such as aluminium trihydrate and magnesium hydroxide.

In embodiments where the vehicle is an organic medium present in the composition, it is preferably a polar organic medium or a substantially non-polar aliphatic or aromatic hydrocarbon or halogenated hydrocarbon. By the term "polar" in relation to the organic medium is meant an organic liquid or resin capable of forming moderate to strong bonds as described in the article entitled "A Three Dimensional Approach to Solubility" by Crowley et al. in Journal of Paint Technology, Vol. 38, 1966, at page 269. Such organic media generally have a hydrogen bonding number of 5 or more as defined in the above mentioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40, and these liquids all fall within the scope of the term polar organic liquid as used herein.

Preferred polar organic liquids are dialkyl ketones, alkyl esters of alkane carboxylic acids and alkanols, especially such liquids containing up to, and including, a total of 6 carbon atoms. As examples of the preferred and especially preferred liquids, there may be mentioned dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran.

The substantially non-polar, organic liquids which may be used, either alone or in admixture with the aforementioned polar solvents, are aromatic hydrocarbons, such as toluene and xylene, aliphatic hydrocarbons such as hexane, heptane, octane, decane, petroleum distillates such as white spirit, mineral oils, vegetable oils and halogenated aliphatic and aromatic hydrocarbons, such as trichloro-ethylene, perchloroethylene and chlorobenzene.

Examples of suitable polar resins, as the medium for the dispersion form of the present invention, are film-forming resins such as are suitable for the preparation of inks, paints and chips for use in various applications such as paints and inks. Examples of such resins include polyamides, and cellulose ethers, such as ethyl cellulose and ethyl hydroxyethyl cellulose. Examples of paint resins include short oil alkyd/melamine-formaldehyde, polyester/melamine-formaldehyde, thermosetting acrylic/melamine-formaldehyde, long oil alkyd and multi-media resins such as acrylic, epoxy, polyurethane and urea/aldehyde.

The resin may also be an unsaturated polyester resin including the so-called sheet molding compounds and bulk molding compounds which may be formulated with reinforcing fibres and fillers. Such molding compounds are described in DE 3,643,007 and the monograph by P. F. Bruins entitled "Unsaturated Polyester Technology", Gordon and Breach Science publishers, 1976, pages 211 to 238.

If desired, the dispersions may contain other ingredients, for example, resins (where these do not already constitute the organic medium) binders, fluidizing agents (such as those described in GB-A-1508576 and GB-A-2108143), anti-sedimentation agents, plasticizers, levelling agents and preservatives.

The composition of particulate solid, polyurethane dispersant, and optional vehicle typically contains from 5 to 95% by weight of the particulate solid, the precise quantity depending on the nature of the solid and the relative densities of the solid and the organic medium. For example, a composition in which the solid is an organic material, such as an organic pigment, preferably contains from 15 to 60% by weight of the solid whereas a composition in which the solid is an inorganic material, such as an inorganic pigment, filler or extender, preferably contains from 40 to 90% by weight of the solid based on the total weight of composition.

The composition is preferably prepared by milling the particulate solid in the organic medium at a temperature which is not greater than 40° C. and especially not greater than 30° C. However, when the solid is a crude phthalocyanine pigment such as copper phthalocyanine, it is sometimes preferable to carry out the milling in an organic liquid at a temperature between 50 and 150° C. since greener and brighter shades may be obtained. This is particularly the case where the organic liquid is a high boiling aliphatic and/or aromatic distillate.

The composition may be obtained by any of the conventional methods known for preparing dispersions. Thus, the solid, the organic medium and the dispersant may be mixed in any order, the mixture then being subjected to a mechanical treatment to reduce the particles of the solid to an appropriate size, for example, by ball milling, bead milling, gravel milling or plastic milling until the dispersion is formed. Alternatively, the solid may be treated to reduce its particle size independently or in admixture with either the organic medium or the dispersant, the other ingredient or ingredients then being added and the mixture being agitated to provide the dispersion.

If the composition is required in dry form, the liquid medium is preferably volatile so that it may be readily removed from the particulate solid by a simple separation means such as evaporation. It is preferred, however, that the composition comprises the liquid medium.

If the dry composition consists essentially of the dispersant and the particulate solid, it preferably contains at least 0.2%, more preferably at least 0.5% and especially at least 1.0% dispersant based on weight of the particulate solid. Preferably the dry composition contains not greater than 100%, preferably not greater than 50%, more preferably not greater than 20%, and especially not greater than 10% by weight dispersant based on the weight of the particulate solid.

As described hereinbefore, the compositions are particularly suitable for preparing millbases where the particulate solid is milled in a liquid medium in the presence of both a particulate solid and a film-forming resin binder.

Thus, according to a still further aspect of the invention there is provided a millbase comprising a particulate solid, dispersant and a film-forming resin.

Typically, the millbase contains from 20 to 70% by weight particulate solid based on the total weight of the millbase. Preferably, the particulate solid is not less than 30 and especially not less than 50% by weight of the millbase.

The amount of resin in the millbase can vary over wide limits but is preferably not less than 10%, and especially not less than 20% by weight of the continuous/liquid phase of the millbase. Preferably, the amount of resin is not greater than 50% and especially not greater than 40% by weight of the continuous/liquid phase of the millbase.

In embodiment, 1 preferably component (a) is a diisocyanate or mixtures of diisocyanates such as toluene diisocyanate (TDI), isophorone diisocyanate (IPDI), hexanediisocyanate (HDI), α,α-tetramethylxylene diisocyanate (TMXDI), diphenylmethane-4,4-diisocyanate (4,4'-MDI), diphenylmethane-2,4-diisocyanate (2,4'-MDI) and dicyclohexylmethane-4,4'-diisocyanate (HMDI). Preferably, component (a) is either TDI or IPDI or MDI.

The compound having a polyether chain which is component (b) is preferably poly($C_{2-3}$-alkylene oxide) which contains less than 60% poly(ethylene oxide) and also preferably contains two groups which react with isocyanates. Preferably, the amount of ethylene oxide is less than 40% and especially less than 20% by weight of the poly($C_{2-3}$-alkylene oxide) chain. There are a number of ways of incorporating a polyether lateral chain into an organic compound which contains these groups which react with isocyanates.

Thus, in the case where the two groups which react with isocyanates are both hydroxyl, a poly($C_{2-4}$-alkylene oxide) chain may be conveniently attached by isocyanates having a functionality of two or more. Compounds of this type are described in U.S. Pat. No. 4,794,147, which involves sequentially reacting a mono-functional polyether with a polyisocyanate to produce a partially capped isocyanate intermediate and reacting the intermediate with a compound having at least one active amino hydrogen and at least two active hydroxyl groups.

One preferred class of compound of this type may be presented by the formula 1.

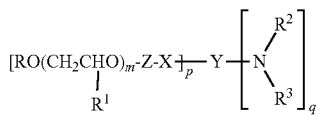

wherein
R is $C_{1-20}$-hydrocarbyl group;
$R^1$ is hydrogen, methyl or ethyl of which less than 60% is hydrogen;
$R^2$ and $R^3$ are each, independently, $C_{1-8}$-hydroxyalkyl;
Z is $C_{2-4}$-alkylene;
X is —O— or —NH—;
Y is the residue of a polyisocyanate;
m is from 2 to 150 and more preferably from 5 to 150;
p is from 1 to 4; and
q is 1 or 2.

R may be alkyl, aralkyl, cycloalkyl or aryl.

When R is aralkyl, it is preferably benzyl or 2-phenylethyl.

When R is cycloalkyl it is preferably $C_{3-8}$-cycloalkyl such as cyclohexyl.

When R is aryl it is preferably naphthyl or phenyl.

When R is alkyl, it may be linear or branched and preferably contains not greater than 12, more preferably not greater than 8 and especially not greater than 4 carbon atoms. It is especially preferred that R is methyl or butyl.

The $C_{2-4}$-alkylene radical represented by Z may be ethylene, trimethylene, 1,2-propylene or butylene.

Preferably m is not less than 10. It is also preferred that m is not greater than 100 and especially not greater than 80.

When q is 2 it is possible to link two different polyurethane polymer chains but it is much preferred that q is 1.

When the polyisocyanate has a functionality which is greater than 2, the compound which is component (b) may carry more than one poly(alkylene oxide) chain. However, it is much preferred that p is 1, q is 1 and that Y is the residue of a diisocyanate.

When $R^1$ is a mixture of hydrogen and methyl and Z is 1,2-propylene and X is —NH— the compound of formula 1 is a derivative of polyalkylene glycol amine such as a Jeffamine™ M polyether available from Huntsman Corporation.

Preferably, $R^2$ and $R^3$ are both 2-hydroxyethyl.

It is also preferred that X is O.

Compounds of formula 1 are typically prepared by reacting a mono-functional polyether with a polyisocyanate in an inert solvent such as toluene at a temperature of from 50 to 100° C. until the desired isocyanate value is reached optionally in the presence of an acid catalyst. In one embodiment the acid catalyst is present and in another embodiment the acid catalyst is absent. The temperature is then normally reduced to between 40 and 60° C. when the requisite secondary amine such as diethanolamine is added.

Useful compounds of formula 1 have been used as component (b) by reacting a poly(propylene glycol) mono methyl ether, a poly(propylene glycol) mono butyl ether or a Jeffamine™ M series polyether having a number average molecular weight of from 250 to 5,000 with a diisocyanate such as TDI followed by diethanolamine.

A second preferred type of compound which can be used as component (b) is of formula 2.

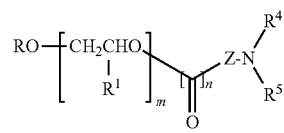

wherein
R, $R^1$, Z and m are as defined hereinbefore;
$R^4$ is an isocyanate reactive organic radical (group);
$R^5$ is hydrogen or an isocyanate-reactive organic radical; and
n is 0 or 1.

The organic radical represented by $R^4$ and $R^5$ is an organic radical containing an isocyanate-reactive group, such as —OH, —SH, —COOH, —PO$_3$H$_2$ and —NHR$^6$ in which $R^6$ is hydrogen or optionally substituted alkyl. As specific examples of isocyanate-reactive radicals, there may be mentioned hydroxyalkyl, hydroxy alkoxy alkyl, hydroxy (poly alkylene oxy) alkyl and hydroxy alkoxy carbonyl alkyl.

A preferred type of compound of formula 2 is where n is zero, Z is 1,2-propylene, $R^4$ is —CH$_2$CH$_2$C(O)—O-(L)$_{q'}$-H. Wherein L is a hydrocarbyl group or alkoxy group, preferably L is a $C_2$ to $C_3$ hydrocarbyl group or alkoxy group; and q' is 1 to 20, preferably 1 to 6 and most preferably 1. $R^5$ is hydrogen. Compounds of this type are obtainable or obtained by the Michael addition reaction of a poly(alkylene oxide) monoalkyl ether monoamine and a hydroxy functional acrylate such as 2-hydroxyethyl acrylate or hydroxypropyl acrylate. A suitable source of poly(alkylene oxide) monoalkyl ether monoamine is the Jeffamine™ M series of polyethers available from Huntsman Corporation. The reaction between the poly(alkylene oxide) mono alkylether monoamine and 2-hydroxy functional acrylate is typically carried out in the presence of air and at a temperature of 50 to 100° C., optionally in the presence of a polymerization inhibitor such as hydroquinone or butylated hydroxy toluene.

Another preferred type of compound of formula 2 is where n is zero, Z is 1,2-propylene and $R^4$ and $R^5$ are both 2-hydroxyethyl. Compounds of this type may be prepared by reacting a poly(alkylene oxide) mono alkyl ether mono amine with ethylene oxide under acidic conditions.

Yet another preferred type of compound of formula 2 is where n is zero, Z is 1,2-propylene and $R^4$ is —CH$_2$CH$_2$C(O)—O-(L)$_{q'}$-H and $R^5$ is hydrogen. Wherein L is a hydrocarbyl group or alkoxy group, preferably L is a $C_2$ to $C_3$ hydrocarbyl group or alkoxy group; and q' is 1 to 20, preferably 1 to 6 and most preferably 1. $R^5$ is hydrogen. Compounds of this type may be prepared by reacting a poly(alkylene oxide) mono alkyl ether mono amine with about one stoichiometric equivalent of ethylene oxide under acidic conditions.

Poly(alkylene oxide) monoalkyl ether monoamines may also be obtained from reaction of a poly(alkylene oxide) monoalkyl ether with acrylonitrile and hydrogen reduction according to the following general scheme where R and $R^1$ are as previously described.

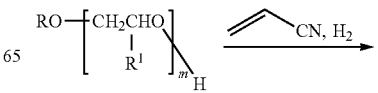

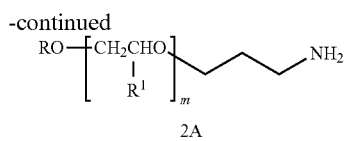

2A

A further preferred type of compound of formula 2 where n is zero, Z is 1,3-propylene and $R^4$ is 2-hydroxyethyl and $R^5$ is hydrogen may be obtained from reaction between poly(alkylene oxide) monoalkyl ether monoamines of formula 2A and a hydroxy functional acrylate such as 2-hydroxyethyl acrylate or hydroxypropyl acrylate.

A third preferred type of compound which may be used as component (b) is of formula 3:

wherein R, $R^1$ and m are as defined hereinbefore and W is $C_{2-6}$-alkylene and especially ethylene. Compounds of this type are obtainable or obtained by the Michael addition reaction of a hydroxy amine and a poly(alkylene oxide) acrylate.

A fourth preferred type of compound which may be used as component (b) is of formula 4.

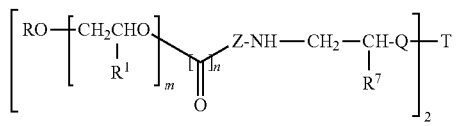

wherein

R, $R^1$, Z, m and n are as defined hereinbefore;

$R^7$ represents hydrogen, halogen or $C_{1-4}$ alkyl;

Q is a divalent electron withdrawing group; and

T is a divalent hydrocarbon radical which may carry substituents or contain hetero atoms.

Examples of electron withdrawing groups which may be represented by Q include —CO—, —COO—, —SO—, —SO$_2$—, —SO$_2$O— and —CONR$^8$— in which $R^8$ is hydrogen or alkyl.

Hydrocarbon radicals which may be represented by T include alkylene, arylene and mixtures thereof, said radicals optionally carrying substituents or containing hetero-atoms. Examples of suitable radicals represented by T are alkylene radicals containing from 1 to 12 carbon atoms, oxyalkylene and polyoxyalkylene radicals of the formula —(CH$_2$CH(R$^1$)O)$_x$— wherein $R^1$ is as defined hereinbefore and x is from 1 to 10,

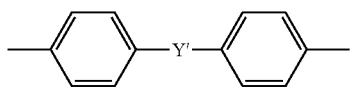

phenylene and diphenylene radicals and other arylene radicals such as wherein Y' is —O—, —S—, —CH$_2$—, —CO— or —SO$_2$—

The compounds of Formula 4 are obtainable or obtained by the Michael addition reaction of two moles of a poly(alkylene oxide) monoalkyl ether monoamine with one mole of an unsaturated compound of the formula 5.

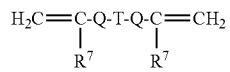

5 wherein Q, T and $R^7$ are as defined hereinbefore.

Examples of unsaturated compounds of Formula 5 are especially diacrylates and dimethacrylates wherein T is a $C_{4-10}$-alkylene residue, a polyoxyalkylene residue or an oxyethylated Bisphenol A residue.

When component (b) is a polyester containing two groups which react with isocyanates the polyester chain may be made by polymerizing one or more hydroxy carboxylic acids or lactones thereof in the presence of either a hydroxy or carboxy containing compound which acts as a polymerization terminating moiety.

The polyester obtained using a hydroxy containing compound as chain terminating compound is preferably of formula 6.

6 wherein m' is from 2 to 150 and more desirably from 5 to 150;

$R^9$ is $C_{1-50}$-hydrocarbyl group; and

A is $C_{1-26}$-alkylene and/or $C_{2-26}$-alkenylene.

The polyester obtained using a carboxylic containing compound as chain terminating compound is preferably of formula 7.

7 wherein $R^9$, A and m' are defined hereinbefore.

The polyester of Formulae 6 and/or 7 are typically made by reacting one or more hydroxy carboxylic acids together with either a hydroxy containing compound or carboxy containing compound at 50 to 250° C. in an inert atmosphere and in the presence of an esterification catalyst. Typical process conditions are described in WO 01/80987.

Compounds of Formula 6 may be reacted with a polyisocyanate and a secondary amine under similar conditions described for the preparation of compounds of Formula 1 to form polyester analogues.

Compounds of Formula 7 may be converted to a mono hydroxy compound by reacting with a diol such as ethylene glycol or propylene glycol and the resulting mono hydroxy derivative treated in similar manner to the compound of Formula 6 in preparing polyester analogues to the polyether of Formula 1.

A polyester which contains 2 functional groups which are reactive towards an isocyanate at one end of the polyester may be prepared by the Michael addition of an aminoalcohol with a polyester acrylate such as a polycaprolactone acrylate with ethanolamine.

When component (b) is a compound which contains a poly(alk)acrylate chain, it is preferably a poly(meth)acrylate containing either two hydroxyl groups at one end of the acrylate chain or one hydroxyl and one imino group at one end of the acrylate chain. The two hydroxyl groups or the one hydroxyl and one imino group are preferably separated by 1 to 6 carbon atoms. Polyacrylates of this type are obtainable or obtained by reacting a diol with an acrylate by, for example, Atom Transfer Radical Polymerization as illustrated by the following reaction scheme. Reactions of this type are disclosed in Macromolecules 1995, 28, 1721 and 1997, 30, 2190 and in J. Am. Chem. Soc. 1995, 117, 5614.

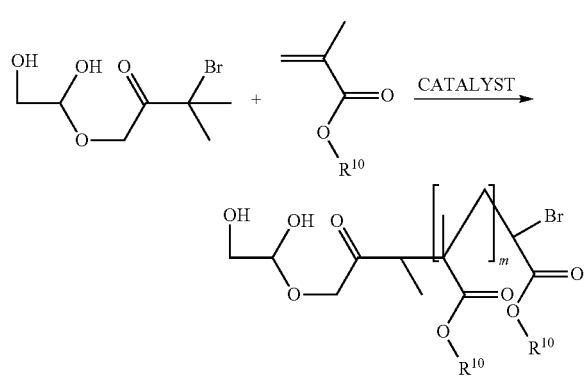

wherein $R^{10}$ is $C_{1-20}$-hydrocarbyl group and m is as defined hereinbefore e.g. from 2 to 150 and more desirably from 5 to 150.

Alternatively, a dihydroxy functional poly(alk)acrylate may be prepared by the free radical polymerization of a (meth)acrylate monomer(s) in the presence of a dihydroxy functional chain transfer agent such as thioglycerol according to the following reaction scheme.

The reaction is preferably carried out in the presence of an initiator such as azo bis-(isobutyronitrile) (AIBN).

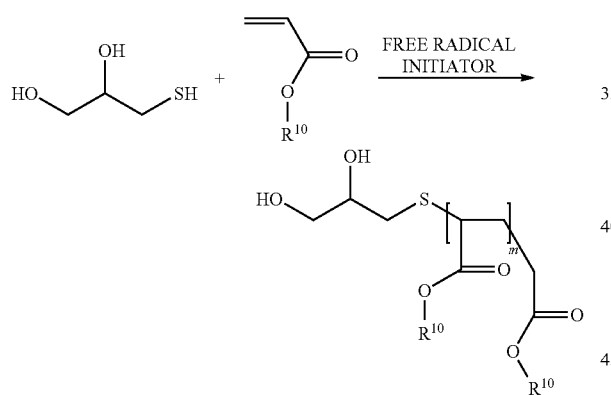

wherein $R^{10}$ and m are as defined hereinbefore.

Monohydroxy functional polymer chains (polyether, polyester or poly(alk)acrylate) may be converted to polymer chains containing both a hydroxyl and imino group at one end by first reaction with an isocyanate functional acrylate followed by a Michael addition of an alkanolamine to the resulting adduct.

The following scheme illustrates such a synthetic conversion starting with a monohydroxy functional polyester.

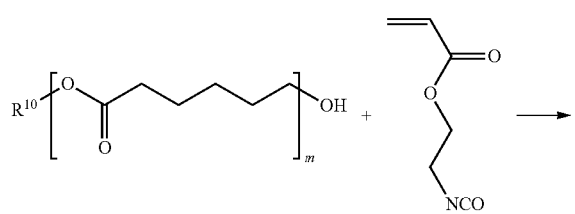

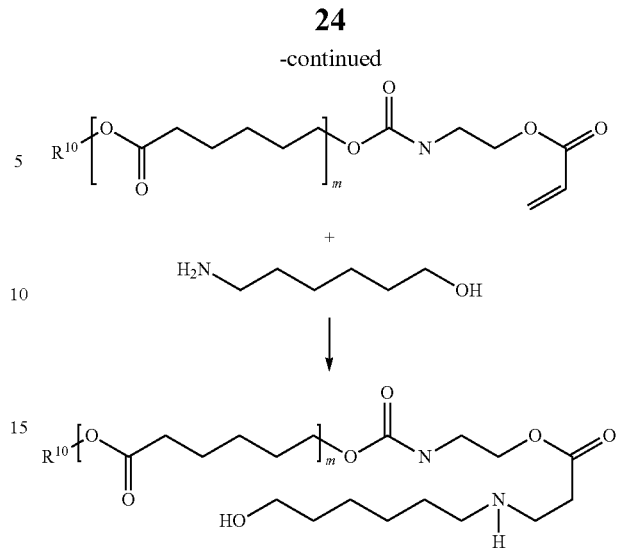

wherein $R^{10}$ and m are as defined hereinbefore.

When component (b) is a compound which contains a polyolefin chain, it is preferably a polyolefin containing either two hydroxyl groups at one end of the polyolefin chain or one hydroxyl and one imino group at one end of the polyolefin chain. It is preferred that the polyolefin chain is polyisobutylene. Polyisobutylene chains which contain 2 or more isocyanate reactive groups at one end of the chain may be prepared from polyisobutenyl succinic anhydride (PIBSA). Reaction of PIBSA with an alkyl diamine yields a polyisobutylene with a primary amine on one end. This is illustrated for one type of PIBSA.

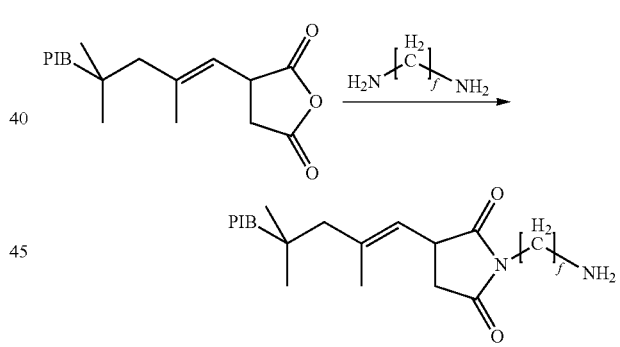

The primary amine ended polyisobutylene chain may be converted to yield a product with two isocyanate reactive groups by Michael addition of a hydroxy functional acrylate or addition of ethylene oxide in an analogous way to that described above for poly(alkylene oxide) monoalkyl ether monoamines.

As disclosed hereinbefore component (c) is a compound containing an acid or amine group and at least two groups which react with isocyanates. Preferably, the compound contains only two groups which react with isocyanates since this restricts cross-linking between adjacent chains of the dispersant. The acid group may be phosphonic, sulphonic or preferably carboxylic, including mixtures thereof. Preferably, the groups of component (c) which react with isocyanates are both hydroxy groups. A preferred diol which is component (a) is a compound of formula 8.

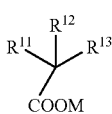

8 wherein at least two of the groups $R^{11}$, $R^{12}$ and $R^{13}$ are $C_{1-6}$-hydroxy alkyl and the remainder is $C_{1-6}$-hydrocarbyl group, which may be linear or branched alkyl, aryl, aralkyl or cycloalkyl, M is hydrogen or an alkaline metal cation, or quaternary ammonium cation. Preferred examples of carboxylic acid components are dimethylolpropionic acid (DMPA) and dimethylolbutyric acid (DMBA).

The acid containing compound which is component (c) may contain other acid groups in addition to or instead of a carboxylic group(s), such as phosphonic or sulphonic acid groups. An example of one such compound is 1,3-benzene dicarboxylic acid-5-sulpho-1,3-bis(2-hydroxyethyl) ester (EGSSIPA).

When component (c) carries a basic group in addition to the two groups which react with isocyanates it is essential that the basic group does not react with isocyanates. Basic groups of this type are aliphatic tertiary amines, hindered aromatic amines and nitrogen heterocyclic compounds which may be alicyclic or aromatic. Examples of hindered aromatic amines are phenylamines having a steric hindering group in the 2 and/or 6-position. In one embodiment, it is desirable that the dispersant comprise a nitrogen in a non-reactive amine (non-reactive with respect to isocyanates) laterally attached to the polyurethane backbone such that said nitrogen atom is separated by at least two atoms from the closest atom on the backbone. Such non-reactive amines laterally attached are thought to provide better anchoring to some particulate solids. The non-reactive amine preferably is a tertiary amine. The non-reactive amine may also be a quaternary ammonium salt. Specific examples of component (c) having a basic group are N-methyl diethanolamine (NMDA), N-phenyldiethanolanine (NPDA), N,N-bis(2-hydroxyethyl) isonicotinamide (HEINA), 1,1'-{[3-(dimethylamino)-propyl]imino}bis-2-propanol and compound 9 formed from the Michael addition of dimethylaminopropylamine and 2-hydroxyethyl acrylate.

9

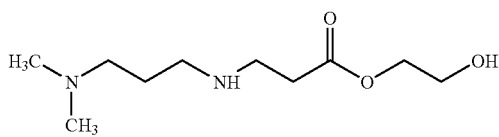

The formative compounds which are component (d) of the polyurethane are preferably difunctional in respect of reactivity with isocyanates for embodiment 1 although a small amount of higher functionality may be used where a small amount of branching of the polyurethane polymer backbone is desired. However, it is preferred that component (d) is difunctional. Preferred reactive groups are amino and hydroxy and it is much preferred that component (d) is a diamine or especially a diol. Component (d), if present, is used primarily as a chain extender to alter the solubility of the polyurethane polymer.

Examples of suitable diamines are ethylene diamine, 1,4-butane diamine and 1,6-hexane diamine.

Examples of suitable diols are 1,6-hexanediol, 1,4-cyclohexanedimethanol (CHDM), 1,2-dodecanediol, 2-phenyl-1, 2-propanediol, 1,4-benzene dimethanol, 1,4-butanediol and neopentyl glycol. The diol may also be a polyether such as a poly ($C_{2-4}$-alkylene glycol), a polyester or polyacrylic diol. The polyalkylene glycol may be a random or block (co)polymer containing repeat ethyleneoxy, propyleneoxy or butyleneoxy groups, including mixtures thereof.

As noted hereinbefore, it is preferred that the polyurethane polymer backbone in embodiment 1 is essentially linear in character. However, some small amount of branching may be unavoidable if there is a presence of polyols or polyisocyantes with a functionality higher than 2 present as an impurity in any of the components. The higher functionality polyols or polyisocyanates are preferred in both embodiments 2 and 3.

As disclosed hereinbefore the chain terminating compound which is component (e) is mono-functional with respect to the isocyanate. The monofunctional group is preferably an amino or hydroxy group. Preferred terminating groups are solubilizing poly($C_{2-4}$-alkylene) mono alkyl ethers, poly($C_{2-4}$-alkylene) mono alkyl ether amines, polyesters, polyacrylates and polyolefins similar to those used in the preparation of the lateral side chain compounds which are component (b) of the polyurethane.

An example of a monoisocyanate which acts as a chain terminating compound (component f) is phenyl isocyanate. An example of a monoisocyanate which contains a carbon to carbon double bond is 2-isocyanatoethyl methacrylate.

It is much preferred that the amount of component (D is zero.

Typical amounts of the aforementioned compounds from which the polyurethane polymers are obtainable are 15-50% component (a), 10-80% component (b), 0-24% component (c), 0-25% component (d), 0-50% component (e) and 0-20% component (f), all based on the total weight of the polyurethane polymer.

When component (e) is a monofunctional polyether, polyester, poly(alk)acrylate or polyolefin the total amount of component (b) with component (e) is preferably not less than 35% and where component (e) is other than a monofunctional polyether, polyester or poly(alk)acrylate the amount of component (b) is preferably not less than 35%.

Alternatively, the ratio of total number of isocyanate groups provided by component (a) and optionally component (f) is greater that the total number of isocyanate reactive groups provided by component (b) and components (c), (d) and (e) when present. The resultant polyurethane is then a prepolymer containing residual isocyanate functionality. This prepolymer may then be reacted with other chain extenders such as component (d) which conjoins different prepolymer chains and/or with chain terminating compounds which are component (e), optionally prior to or during dissolution in water or other polar solvent. In one embodiment prepolymer is reacted with chain extenders prior to dissolution solvent. In one embodiment prepolymer is reacted with chain extenders during dissolution in solvent. In one embodiment prepolymer is reacted with chain extenders prior to dissolution in the absence of water or other solvent. In one embodiment the prepolymer may be reacted with chain extenders in the absence of water.

The preparation of prepolymers can be useful since it is a means of controlling viscosity during the preparation of the polyurethane polymer, especially in circumstances where the reaction is carried out in the absence of any solvent.

When a prepolymer is formed which contains isocyanate functionality, chain extension may be carried out by water itself, or a polyol, amino-alcohol, a primary or secondary aliphatic, alicyclic, aromatic, aralphatic or heterocyclic polyamine especially a diamine, hydrazine or a substituted hydrazine. This type of reaction is used more significantly in embodiment 3.

Examples of suitable chain extenders include ethylenediamine, diethylene triamine, triethylene tetramine, propylenediamine, butylenediamine, hexamethylenediamine, cyclohexylenediamine, piperazine, 2-methyl piperazine, phenylenediamine, tolylene diamine, xylylene diamine, tris (2-aminoethy)amine, 3,3'-dinitrobenzidine, 4,4'methylenebis(2-chloraniline), 3,3'-dichloro-4,4'bi-phenyl diamine, 2,6-diaminopyridine, 4,4'-diaminodiphenylmethane, methane diamine, m-xylene diamine, isophorone diamine, and adducts of diethylene triamine with acrylate or its hydrolyzed products. Also materials such as hydrazine, azines such as acetone azine, substituted hydrazines such as, for example, dimethyl hydrazine, 1,6-hexamethylene-bis-hydrazine, carbodihydrazine, hydrazides of dicarboxylic acids and sulphonic acid such as adipic acid mono- or dihydrazide, xalic acid dihydrazide, isophthalic acid dihydrazide, tartaric acid dihydrazide, 1,3-phenylene disulphonic acid dihydrazide, omega-aminocaproic acid dihydrazide, hydrazides made by reacting lactones with hydrazide such as gamma-hydroxylbutyric hydrazide, bis-semi-carbazide carbonic esters of glycols such as any of the glycols mentioned above. Hexamethylenediamine is especially preferred.

The chain extension can be conducted at elevated, reduced or ambient temperatures. Convenient temperatures are from about 5° C. to 95° C.

When employing a prepolymer in the preparation of the polyurethane polymer, the amount of chain extender and chain terminating compound are chosen to control the molecular weight of the polyurethane polymer. A high molecular weight will be favoured when the number of isocyanate-reactive groups in the chain extender is approximately equivalent to the number of free isocyanate groups in the prepolymer. A lower molecular weight of the polyurethane polymer is favoured by using a combination of chain extender and chain terminator in the reaction with the polyurethane prepolymer.

An inert solvent may be added before, during or after formation of the polyurethane polymer/prepolymer in order to control viscosity. Examples of suitable solvents are acetone, methylethylketone, dimethylformamide, dimethylacetamide, diglyme, N-methylpyrrolidone, butylacetate, methoxypropyl acetate, ethylacetate, ethylene and propylene glycoldiacetates, alkyl ethers of ethylene and propylene glycol acetates, toluene, xylene and sterically hindered alcohols such as t-butanol and diacetone alcohol. Preferred solvents are ethyl acetate, butyl acetate, methoxy propylacetate and N-methylpyrrolidone. The polyurethane may also be formed in the presence of unsaturated monomers which include mono functional and polyfunctional (meth)acrylates and styrenic monomers.

The number average molecular weight of the polyurethane polymer is preferably not less than 2,000, more preferably not less than 3,000 and especially not less than 4,000. It is also preferred that the number average molecular weight of the polyurethane polymer is not greater than 50,000, more preferably not greater than 30,000 and especially not greater than 20,000.

It is preferred for embodiment 1 and subsequent embodiments that the amount of residual isocyanate functionality in the dispersant is less than 0.1% and more preferably about zero.

EMBODIMENT 2

According to the invention, there is provided a non-aqueous composition comprising a particulate solid, an organic medium and a polyurethane dispersant having an essentially non-linear backbone with laterally and or terminally attached solvent-solubilizing side chains of a polyester, a polyacrylic, a polyether or a polyolefin including mixtures of such side chains. The polyurethane dispersant is further characterized in that it also comprises groups containing carbon carbon double bonds in the same amounts as in embodiment 1. Similar to embodiment 1 subsequent to polyurethane dispersant formation the double bonds may be reacted with a crosslinking agent added to the composition to crosslink (or chain extend) the dispersant around the particle surface. Alternatively, the double bonds may be used to bond the dispersant to a continuous phase in a molding composition, coating, or ink that contains co-reactive continuous phase.

Embodiment 2 differs from embodiment 1 in that a small amount of trifunctional or higher monomer in the urethane forming reactions are used. This generates some branch points in the polyurethane backbone. The trifunctional or higher reactants can be polyols, polyamines, or polyisocyanates. For embodiment 2 it is preferred that the higher functional reactants are polyols or polyamines. It is especially preferred that they are polyols.

In embodiment 2, the proportions of mono, di and higher functional components in the polyurethane synthesis are chosen such that a branched polyurethane is produced as opposed to a fully crosslinked gel. It is preferred that the number average molecular weight of the polyurethane is not greater than 100,000. It is more preferred number average molecular weight of the polyurethane is not greater than 70,000 and especially not greater than 40,000. It is preferred that the number average molecular weight of the polyurethane is at least 3,000. It is more preferred number average molecular weight of the polyurethane is at least 5,000 and especially at least 7,000. It is preferred that the average number of branch points in the polyurethane is at least 1. It is more preferred that the average number of branch points in the polyurethane is at least 2 and especially at least 3. It is also preferred that the average number of branch points in the polyurethane is not greater than 20. It is more preferred that the average number of branch points in the polyurethane is not greater 12 and especially not greater 8. (The average number of branch points in the polyurethane may be calculated from the molar proportions of mono, di and higher functional compounds used to prepare the polyurethane).

Embodiment 2 can be made according to the same general procedure for forming embodiment 1 from components a-f with the following substitutions.

For the (a) component (polyisocyanates), the functionality can be from about 2 to about 10 (on average) and in one aspect from about 2 to about 6. The additional isocyanates with functionality from about 2.5 to about 6 or 10 are well known materials and more fully described in U.S. Pat. No. 6,509,409 column 4, line 8, through column 7, line 18. The isocyanates may be blends of different isocyanates or reaction products of excess equivalents of isocyanates with polyols or polyamines to form polyfunctional isocyanates. It is preferred that the average functionality of polyisocyanate is from 2.0 to 2.5. It is more preferred that the average functionality of polyisocyanate is from 2.0 to 2.2. It is especially preferred that the average functionality of polyisocyanate is about 2.0.

In embodiment 2, the presence of component (b), the lateral solubilizing chains, is optional. It was considered essential in some aspects of the invention to have lateral side chain solubilizing groups to get the sufficient solubilizing chains in the dispersant.

It is preferred that one or more formative compounds (d) are present. For the formative compounds of component (d), it is preferred that the average number of groups that react with isocyanates is greater than 2.0, more preferred greater than 2.05 and especially greater than 2.1. It is preferred that the average number of groups that react with isocyanates is not more than 3.0. It is more preferred that that the average number of groups that react with isocyanates is not more than 2.6 and especially not greater than 2.4.

At least one of the components (a) or (d) must have an average functionality greater than 2.0.

The isocyanates of embodiment 2 can be prereacted with any of the other components (such as a mono-functional or difunctional solvent-solubilizing component) as there are generally less restrictions on reaction conditions with components having a functionality above 2.

Embodiment 2 may look like the structure below which schematically depicts a polyurethane wherein terminal solubilizing chains are present with six branch points.

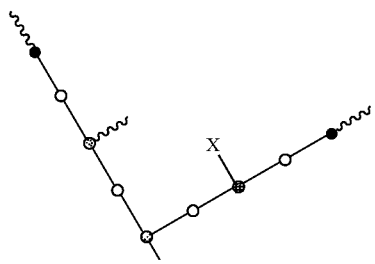

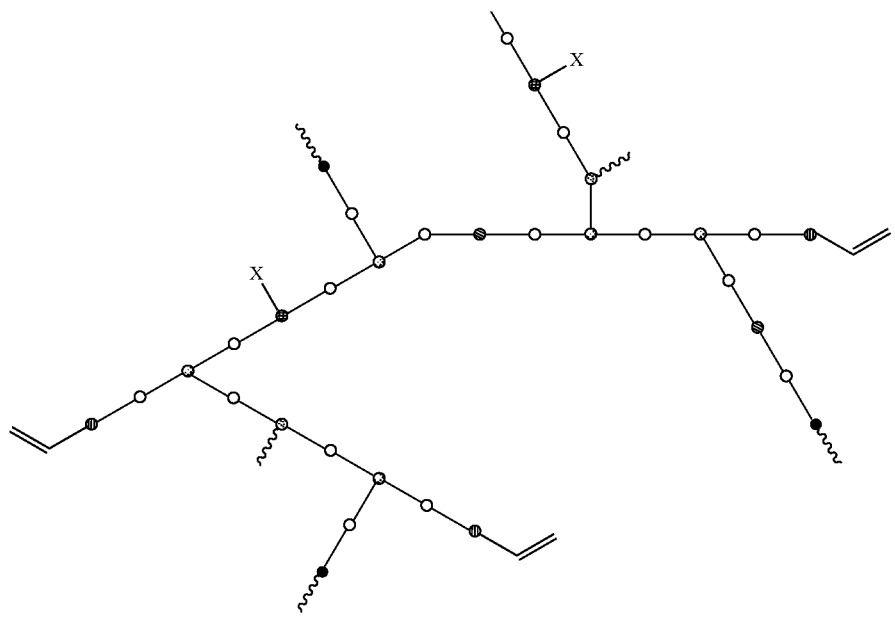

 represents a residue of trifunctional formative compound (component d). The other symbols and textures will have the same definitions as earlier (on pages 3 and 4 of the application).

EMBODIMENT 3

The polyurethane dispersants disclosed by Byk (U.S. Pat. Nos. 4,647,647; 4,795,796; 4,942,213; and EP 154,678), Efka (U.S. Pat. Nos. 5,399,294; 5,425,900; and 5,882,393) and Avecia U.S. Pat. No. 6,509,409 can also be modified to include carbon to carbon double bonds in the same amounts as embodiment 1 using the same reactants of embodiments 1 and 2 and optionally a slightly different reaction procedure. The starting materials for embodiment 3 include the starting materials from embodiments 1 and 2 along with the use of proportionately more urethane forming monomers of higher than 2 functionality. The isocyanates ("a") in embodiment 3 are the same as in embodiment 2, and typically in embodiment 3 the isocyanates on average have higher functionality than 2. The compounds "b" of embodiment 3 are usually absent (meaning there is usually monofunctional solvent-solubilizing chains from component (e)) The remainder of the components are very similar/interchangeable.

The polyurethane dispersants from Byk and Efka are characterized in that they are made with polyisocyanates. For Byk patents functionality of the polyisocyanate is $\geq 2.5$ for Efka>2. Monofunctional solvent solubilizing chains are on average a little less expensive than difunctional solubilizing chains. The polyurethanes of embodiment 3 are prepared in a 3 stage process.

Stage 1
A portion of the isocyanate groups of the isocyanate component "a" are reacted with a polymer chain (polyester, polyether, polyacrylate or polyolefin) which contains one group which reacts with isocyanates (the solvent solubilizing chain of the dispersant) component (e).

Stage 2
A further portion of the isocyanate groups are reacted with material(s) which contain 2 or more groups that react with isocyanates (component "d") e.g. a diol such as a PEG. This serves to link together several of the polyisocyanate derivatives to build molecular weight. Optionally a compound having an amino group (component "c") or a chain terminator (component "e") may be added at this stage. Any of components b-f may contain carbon to carbon double bonds.

Stage 3
The residual isocyanates (if present) can then be reacted e.g. with materials such as e and f of embodiments 1 and 2 which are monofunctional with respect to reactivity with isocyanate to introduce other functional groups e.g., tertiary or aromatic amines as in U.S. Pat. No. 4,647,647.

Incorporation of carbon to carbon double bonds may be achieved by either (i) incorporating the double bond in the solvent solubilizing chain introduced in stage 1 e.g. using a polymeric chain (e.g. polylactone) with a hydroxy group at one end and an acrylate at the other, or (ii) Incorporating the carbon to carbon double bond using a mono functional material with respect of isocyanate reactive groups (such as a hydroxyl functional acrylic monomer like hydroxyethyl acrylate) such that the double bond is closer to the anchoring core.

If a primary or secondary amine functional material is absent in stage 3, it would be possible to add the hydroxy functional acrylate (or similar) at any stage. However, if you do use such an amine the acrylate will have to be added last to prevent reaction between the amine and the activated double bond.

The invention thus relates to addition compounds or their salts suitable as dispersing agents which contain reactive carbon carbon double bonds. Such compounds are obtainable by the reaction of polyisocyanates, hydroxyl compounds, compounds having Zerewitinoff-active hydrogen and at least one basic group containing nitrogen, and optionally compounds containing amine hydrogen, optionally in the presence of solvents and optionally in the presence of reaction catalysts, characterized in that they are obtainable by the reaction of polyisocyanates (a) having an average functionality of from 2.5 to 6 with monohydroxyl compounds (e) of the formula I $$Y''\text{—OH} \qquad \qquad \text{I}$$

wherein Y" has the following meanings:
(i) aliphatic and/or cycloaliphatic hydrocarbon groups with 8 to 30 carbon atoms in which the hydrogen atoms may be partly replaced by halogens and/or aryl groups, (ii) aliphatic, cycloaliphatic and/or aromatic groups with molecular weights of from 350 to 8000 which contain at least one —O— and/or —COO— group and in which the hydrogen atoms may be partly replaced by halogens.

Optionally, the group Y" contains at least one carbon to carbon double bond. Desirably from 15 to 50%, preferably 20 to 40% and most preferably 20 to 35% of the NCO groups are reacted. Reacting the resulting reaction product in such a quantity with compounds (d) of the formula II $$G\text{-}(E)_{n'} \qquad \qquad \text{II}$$

wherein E stands for —OH, —CO$_2$H, —NH$_2$ and/or —NHR (wherein R represents an alkyl group having 1 to 4 carbon atoms) and n' stands for 2 or 3, and G represents an aliphatic, cycloaliphatic and/or aromatic group with molecular weights of at the most 3000 which has at least 2 carbon atoms and may contain —O—, —COO—, —CONH—, —S— and/or —SO$_2$— groups, that a further 15 to 45%, preferably 20 to 40% and most preferably 20 to 35% of the NCO groups of the polyisocyanates originally put into the process are reacted but the sum of the degrees of NCO reaction of reactions (a) and (b) amounts to at least 40% and at the most 75%, preferably 45 to 65% and most preferably 45 to 55%.

Optionally, the group G contains at least one carbon to carbon double bond (c) reacting the resulting reaction product in such a quantity with compounds (e) of the general formula III & IV $$Z'\text{-}Q' \qquad \qquad \text{III}$$

$$T'\text{-}Q' \qquad \qquad \text{IV}$$

wherein Q' stands for —OH, —NH$_2$, —NHR$^{16}$ (wherein R$^{16}$ stands for an alkyl group having 1 to 4 carbon atoms) or —SH, and Z' is an aliphatic group with 2 to 10 carbon atoms containing at least one tertiary amino group or a heterocyclic group containing at least one basic ring nitrogen atom which carries no hydrogen atom, which heterocyclic group may be attached to the group Q' by way of an alkylene group having up to 10 carbon atoms, T' is a group which contains at least one carbon to carbon double bond, that at least one molecule of the compounds III and IV is available for each remaining isocyanate group which has not been reacted in stages (a) and (b). The amount of compound IV can vary from 0-100% of the amount needed to react with the remaining isocyanate groups.

Reaction with compounds III and IV may occur sequentially or together. However it is preferred that reaction of compound III occurs first especially if T' contains an acrylate group and Q' in compound III is —NH$_2$ or —NHR$^{16}$.

It is necessary that at least one or more of the compounds I, II or IV contain a carbon to carbon double bond.

The invention also relates to the process for the preparation of the addition compounds as described above.

The invention further relates to the use of the addition compounds described above as dispersing agents.

Crosslinking the Dispersant for Encapsulation of Particle

The dispersant can be crosslinked or chain extended around the particulate matter of the composition. The crosslinking or chain extension is achieved by addition of a crosslinking agent which contains functional groups which react with the double bonds contained within the dispersant or by an addition polymerization reaction of those double bonds.

If a crosslinking agent is used, it may be added at any stage of the dispersion process, but it is preferred if it is added after the particles have been dispersed in the liquid medium with the dispersant already present. It is preferred that the average functionality of the crosslinking agent is at least 2. It is especially preferred if the average functionality of crosslinking agent is 3 or more. It is preferred that the crosslinking agent it comprises amine functionality (primary &/or secondary). It is preferred that the average functionality of the total of primary and secondary amine groups in the crosslinker is 2 or more. It is preferred that the crosslinker contains at least 2 primary amine groups.

The amount of polyfunctional amine required in the composition will depend on the amount of dispersant used and functionality of each with respect to primary and secondary amine groups and reactive double bonds respectively. It is preferred if the ratio of primary and secondary amine groups to reactive double bonds is the range of 1 to 10 and 10 to 1. It is more preferred if the range is 1 to 5 to 5 to 1. It is especially preferred if the range is 1 to 3 to 3 to 1.

The polyfunctional amines for crosslinking can be from a wide variety of materials and can be used as a single material or in mixtures of such materials. They may be aliphatic or aromatic. There are numerous specific examples. H$_2$N (CH$_2$)$_{n''}$. NH$_2$ where n''=2 to 20, specific examples include n''=2, n''=6, n''=12; H$_2$N(CH$_2$CH$_2$NH)$_{m''}$CH$_2$ CH$_2$NH$_2$ where m''=1 to 10 preferably 1 to 6; Spermidine, spermine; N,N'-bis(3-aminopropyl)-ethylenediamine; N,N'-bis(3-aminopropyl)-1,3-propanediamine; tris(2-aminoethyl)amine; 4,4'-methylenebis(cyclohexylamine); diaminocyclohexane; I isophorone diamine; polyethyleneimine; Jeffamine D and T series polyether amines (supplied by Huntsman).

Cocure of the Dispersant with a Reactive Binder System

The dispersants may be used in a composition containing a reactive binder system which contains unsaturation. The reactive binder is cured after the addition of the dispersion containing the dispersant. The reactive binder may be liquid as in the case of a 100% UV cure ink or it may be solid for instance for a UV cure powder coating.

The cure may be brought about by generation of free radicals either thermally or from a radiation source. There are many initiators known to those skilled in the art which can be used to generate radicals when subjected to an increase in temperature. The choice of initiator is governed by the desired operating temperature, solubility, desired rate of cure etc. There are many examples of peroxides, hydroperoxides and azo compounds that can be used. The generation of radicals from "thermal" initiators can also be catalysed so that cure can take place at ambient temperatures. One well known example is the use of tertiary amines to catalyse the generation of radicals from peroxides. There are also a wide range of initiators which may be used for UV cure. The choice among other factors will depend on the wavelength of radiation used.

The binder systems may vary greatly in composition. The system will contain reactive unsaturation with which the carbon to carbon double bonds in the dispersant will coreact. These reactive groups may be present on monomeric, oligomeric and/or polymeric components in the reactive binder system. The types of reactive double bonds in the binder may be drawn from acrylate, methacrylate, or styrenic. It will be usual that the reactive binder systems will contain a portion of material which contains a reactive functionality of >2 to enable formation of a cross linked network.

There are a very wide range of monomers and oligomers available with mono, di and polyfunctionality of reactive double bonds. The oligomers include unsaturated polyesters, epoxy acrylates, urethane acrylates, polyester acrylates, polyether acrylates and acrylated acrylics.

The monofunctional monomers include alkyl acrylates, methacrylates, and styrene. Difunctional monomers include the following acrylate functional monomers and their methacrylate equivalents-1,6-hexanediol diacrylate, 1,3-butylene glycol diacrylate, 1,4-butanediol diacrylate, cyclohexane dimethanol diacrylate, diethylene glycol diacrylate, dipropylene glycol diacrylate, ethoxylated bisphenol A diacrylate, and neopentyl glycol diacrylate. Polyfunctional monomers include the following acrylate functional monomers and their methacrylate equivalents—trimethylolpropane triacrylate, pentaerythritol triacrylate, pentaerythritol tetracrylate, and di-trimethylolpropane tetraacrylate.

In sheet and bulk molding compounds, the most common type of reactive binder systems are unsaturated polyester in combination with styrene monomer. The binder is formulated with other components well known to those skilled in the art such as fibres, release agents. Therefore, co-reactivity of the carbon to carbon double bond in the dispersant with styrene is essential for use in these systems.

For reactive curing systems it is particularly desirable to minimize the VOC content of the final formulation. Therefore, it is preferable for the dispersants to be delivered either in a minimum of organic solvent, as 100% active, or dissolved in a reactive component of the curing system.

Preparation of Intermediates

The preparation of the intermediates and dispersants described below was carried out on more than one occasion. Some intermediate preparations were repeated to provide more material for testing.

Intermediate A—Dihydroxy Polyester

1-Dodecanol (32.1 parts, 0.0.172 mol), ε-caprolactone (186.76 parts, 1.631 mol) and δ-valerolactone (60.35 parts, 0.603 mol) were stirred together under nitrogen at 180° C. Zirconium butoxide catalyst (1.34 parts) was added and the reactants were stirred under nitrogen for ca. 20 hours at 180° C. After cooling to 20° C., the polyester was obtained as a waxy solid. This is polyester 1.

Tolylene diisocyanate (26.88 parts,) was added to a reaction vessel with methoxypropyl acetate (100 parts) heated to 40° C. Polyester 1 (250 parts) dissolved in methoxypropyl acetate (100 parts) was added over 2 hours with stirring at 50-60° C. The reaction was monitored using online infrared detection. Reaction was continued at 60° C. for a further 30 minutes after the end of the feed. The temperature was raised to 70° C. and reaction continued for a further 1 hour. At this stage the infrared peak associated with the NCO group was showing no further decrease in size. The reactants were then cooled to 7° C. with an external ice bath and a solution of diethanolamine (16.22 parts) in methoxypropyl acetate (32 parts) was added causing a temperature rise to 21° C. The reaction was continued with stirring at 35° C. until no isocyanate remained.

Intermediate B—Hydroxyamino PO polyether

Jeffamine M2005 (8000 parts), 2-hydroxyethyl acrylate (456.4 parts) and 2,6-di-tert-butyl-4-methyl phenol (2.72 parts) were stirred together for 48 hours at 70° C. until the Michael addition reaction was complete.

Intermediate C

1-Dodecanol (93.15 parts), ε-caprolactone (399.5 parts) and δ-valerolactone (350.4 parts) were stirred together under nitrogen at 150° C. Zirconium butoxide catalyst (4.0 parts) was added and the reactants were stirred under nitrogen for 20 hours at 180° C. After cooling to 20° C., the polyester obtained was a viscous liquid. This is polyester 2.

Tolylene diisocyanate (82.63 parts) was added to a reaction vessel and heated to 50° C. under nitrogen. Polyester 2 (800 parts) was added over 2 hrs with agitation at 50-60° C. The reaction was continued with stirring at 60° C. for 1 hour. The reactants were then cooled to 20° C. and diethanolamine (49.88 parts) was added. The reaction was continued with stirring at 35° C. until no isocyanate remained.

Intermediate D

Hydroxyethyl methacrylate (80.0 parts), ε-caprolactone (666.73 parts) and δ-valerolactone (215.44 parts), 4-methoxy phenol (0.96 parts), tin(II) chloride (0.05 parts) were stirred together under an air atmosphere at 125° C. The reaction was allowed to continue at this temperature for 20 hours. After cooling to 20° C., the polyester was obtained as a waxy solid.

Intermediate E

1-Dodecanol (114.16 parts), s-caprolactone (666.73 parts) and δ-valerolactone (215.44 parts) were stirred together under nitrogen at 150° C. Zirconium butoxide catalyst (4.0 parts) was added and the reactants were stirred under nitrogen for 20 hours at 180° C. After cooling to 20° C., the polyester was obtained as a waxy solid.

Intermediate F

Tolylene diisocyanate (48.02 parts) was added to a reaction vessel heated to 50° C. under nitrogen. Intermediate D (400 parts) was added over 2 hrs with agitation at 50-60° C. The reaction was continued with stirring at 60° C. for 1 hour. The reactants were then cooled to 20° C. and diethanolamine (28.99 parts) was added. The reaction was continued with stirring at 35° C. until no isocyanate remained. Di-tert-butyl-4-methylphenol (0.24 parts) was then added.

Intermediate G

Hydroxyethyl acrylate (71.38 parts), s-caprolactone (666.73 parts) and δ-valerolactone (215.44 parts), 4-methoxy phenol (0.95 parts), tin(II) chloride (0.047 parts) were stirred together under an air atmosphere at 125° C. The reaction was allowed to continue at this temperature for 20 hours. After cooling to 20° C., the polyester was obtained as a waxy solid.

Intermediate H

1-Dodecanol (64.1 parts) and ε-caprolactone (509.97 parts) were stirred together under nitrogen at 150° C. Zirconium butoxide catalyst (2.9 parts) was added and the reactants were stirred under nitrogen for 20 hours at 180° C. After cooling to 20° C., the polyester was obtained as a waxy solid. This is Polyester 3.

Tolylene diisocyanate (41.71 parts) was added to a reaction vessel heated to 50° C. under nitrogen. Polyester 3 (400 parts) was warmed to 50° C. in an oven then added to the reaction vessel over 2 hrs with agitation at 50-60° C. The reaction was continued with stirring at 60° C. for 1 hour. The reactants were then cooled to 20° C. and diethanolamine (25.18 parts) was added. The reaction was continued with stirring at 35° C. until no isocyanate remained.

In the following examples the molecular weight of the dispersants produced were characterized by size exclusion chromatography. The number average molecular weight (Mn) and weight average molecular weight (Mw) values were determined relative to polystyrene standards. For polymerizations carried out in solvent the final solids content of the solution was determined by gravimetric analysis.

Dispersant 1

Dimethylolpropionic acid (7.4 parts, and often referred to as 2,2-bis(hydroxymethyl)propionic acid), 1,4-cyclohexane dimethanol (7.88 parts), Intermediate B (150.0 parts), 2-hydroxyethyl acrylate (4.2 parts), and ethyl acetate (195 parts) were added to a round bottomed flask and heated with agitation to 70° C. under a nitrogen atmosphere. Dibutyltindilaurate (0.1 parts) in ethyl acetate (10 parts) was added. Tolylene diisocyanate (34.62 parts) was added to the reaction vessel dropwise over a period of 30 minutes maintaining the temperature at 70-75° C. Reaction was allowed to continue at this temperature for a further 28 hours when only a trace of isocyanate was detectable by infrared analysis. Ethanol (10 parts) were added and butylated hydroxyl toluene (BHT) (0.02 parts) added as a free radical inhibitor.

Solids content was adjusted to 50 wt. % by addition of ethyl acetate to compensate for small solvent evaporation losses (Mn=12,300 and Mw=24,900).

Comparative Dispersant α

This polyurethane is very similar to example 1 but does not contain any carbon to carbon double bonds. Dimethylolpropionic acid (7.8 parts), 14-cyclohexane dimethanol (10.27 parts), Intermediate B (144.0 parts) 1-butanol (2.93 parts) and ethyl acetate (180 parts) were added to a round bottomed flask and heated with agitation to 70° C. under a nitrogen atmosphere. Dibutyltindilaurate (0.1 parts) in ethyl acetate (10 parts) was added. Tolylene diisocyanate (37.83 parts) was added to the reaction vessel dropwise over a period of 45 minutes maintaining the temperature at 70-75° C. Reaction was allowed to continue at this temperature for a further 28 hours when only a trace of isocyanate was detectable by infrared analysis. (Mn=12,300 and Mw=22,400).

Pigment Dispersion Performance

Dispersion Formulation:

Dispersions were prepared by adding dispersant 1 (8.0 parts) to methoxypropyl acetate (22 parts) in a 4 oz glass jar. Black pigment (20 parts, Printex 35, ex Degussa) was added and the mixture was gently stirred to wet out the pigment. Glass beads (3 mm diameter, 125 parts) were added to the jar. The jar was placed in a Scandex disperser model 200-K and the contents milled by oscillatory shaking for 2 hours. This is Millbase 1.

A solution of tetraethylpentamine (TEPA) (5.88 parts) in ethyl acetate/ethanol (3/1) (100 parts) was prepared. The TEPA solution (0.063 parts) was added to a portion of Millbase 1 (5 parts) together with ethyl acetate/ethanol (3/1) (0.44 parts). This is Millbase 1A. Ethyl acetate/ethanol (3/1) (0.50 parts) was added to a portion of Millbase 1 (5 parts). This is Millbase 1B. The Millbases 1A and 1B (0.5 parts) were let down into a nitrocellulose resin, NC DLX 3/5, (1.5 parts, ex Nobel Enterprises). Millbases and inks were prepared in the same way using Dispersant a to produce Millbase α1 and Inks α1A and α1B.

A portion of the resulting inks were drawn down on to black and white card using a number 3 K-bar. A simple visual assessment was made of the draw downs based on hiding power, jetness and gloss with a scoring system of 1 to 5. A score of 5 indicating the best performance. A control experiment with no dispersant gave a let down with quality equal to 1.

The remaining portion of the inks was stored for 2 weeks at 52° C. The stored inks were drawn down on to black and white in the same away and assessed to see if there had been any change on storage.

TABLE 1

| Ink Reference | | | Initial Rating | Storage at 52° C. |
|---|---|---|---|---|
| 1A | Ink contains TEPA | Dispersant contains C═C | 4 | 4 |
| 1B | No TEPA | No C═C | 4/5 | 2 |
| α1A | Ink contains TEPA | No C═C | 4 | 2/3 |
| α1B | No TEPA | No C═C | 4/5 | 2 |

Only for the ink 1A was there no reduction in quality of the drawdown after 2 weeks storage of the ink at 52° C. For ink 1A both the dispersant used contained carbon to carbon double bonds and TEPA was present in the formulation.

Dispersant 2

Cyclohexane dimethanol (8.57 parts), Intermediate B (165.0 parts), 2,2-bis(hydroxymethyl)propionic acid (8.14 parts), hydroxyethyl acrylate (4.6 parts) and ethyl acetate (224.6 parts) were stirred under nitrogen at 70° C. Dibutyltin dilaurate (0.15 parts) was then added. Tolylene diisocyanate (37.96 parts) charged to the reaction mixture over 60 minutes. The reaction mixture was stirred under nitrogen for a further 20 hours at 70° C. until no isocyanate remained. Solids content was 51 wt. % (Mn=7,600 and Mw=19,900).

Dispersant 3

Cyclohexane dimethanol (9.98 parts), Intermediate B (144.0 parts), 2,2-bis(hydroxymethyl)propionic acid (8.00 parts), poly(propylene glycol) acrylate (18.71 parts) and ethyl acetate (218.71 parts) were stirred under nitrogen at 70° C. Dibutyltin dilaurate (0.1 parts) was then added. Tolylene diisocyanate (37.72 parts) charged to the reaction mixture over 72 minutes. The reaction mixture was stirred under nitrogen for a further 20 hours at 70° C. until no isocyanate remained. Solids content was 50 wt. % (Mn=6,300 and Mw=23,800).

Dispersant 4

Cyclohexane dimethanol (10.18 parts), Intermediate B (144.0 parts), 2,2-bis(hydroxymethyl)propionic acid (7.8 parts), caprolactone 2-(methacryloyloxy)ethyl ester (13.56 parts) and ethyl acetate (213.56 parts) were stirred under nitrogen at 70° C. Dibutyltin dilaurate (0.1 parts) was then added. Tolylene diisocyanate (37.72 parts) charged to the reaction mixture over 30 minutes. The reaction mixture was stirred under nitrogen for a further 20 hours at 70° C. until no isocyanate remained. Solids content was 51 wt. % (Mn=6,300 and Mw=19,400).

Sheet Molding Examples.

To demonstrate that these materials will be reactive in a sheet molding compound type formulation the coreactivity with styrene was investigated.

Copolymerization of dispersants 2, 3 and 4 with styrene.

Styrene (10 parts), dispersant (ca. 21 parts ca. 50 wt. % in ethyl acetate) and toluene (10 g) were charged to a schlenk tube under a nitrogen atmosphere followed by 2,2'-azobis(2-methylpropionitrile) (0.1 parts). The contents were heated for 20 hours at 70° C. then cooled to room temperature. In each case the product of the reaction was gel consistent with a cross linking reaction having occurred between the dispersant and styrene.

To show that gellation did not occur in the absence of the dispersants a homo-polymerization of styrene was carried out under similar conditions. Styrene (10 parts) and toluene (20 parts) were charged to a schlenk tube under a nitrogen atmosphere followed by 2,2'-azobis(2-methylpropionitrile) (0.1 parts). The contents were heated for 20 hours at 70° C. then cooled to room temperature yielding a solution of polystyrene as a clear pourable liquid.

Dispersant 5

N-methyldiethanolamine (2.83 parts), Intermediate A (40.8 parts, 50% solution in methoxypropyl acetate), caprolactone 2-(methacryloyloxy)ethyl ester (1.72 parts) and methoxypropyl acetate (11.3 parts) were stirred under nitrogen at 70° C. Dibutyltin dilaurate (0.03 parts) was then added. Tolylene diisocyanate (6.74 parts) was charged to the reaction mixture over 21 minutes. The reaction mixture was stirred under nitrogen for a further ca. 3 hours at 70° C. until no isocyanate remained. Solids content was 56 wt. % (Mn=8,300 and Mw=25,800).

Dispersant 6

Intermediate B (32.64 parts), cyclohexane dimethanol (5.30 parts), poly(propylene glycol) methacrylate (3.66 parts), dibutyltin dilaurate (0.05 parts) and methoxypropyl acetate (51.66 parts) were added to a round bottom flask and heated with agitation to 70° C. under a nitrogen atmosphere. Tolylene diisocyanate (10.0 parts) was added drop wise over a period of 30 minutes maintaining the temperature at 70-75° C. The reaction was allowed to continue at this temperature for a further 4 hours when only a trace of isocyanate remained. (Mn=11,400 and Mw=34,600).

Dispersant 7

Intermediate B (74.00 parts), hexane diol (7.33 parts), hydroxylethyl acrylate (2.25 parts), dibutyltin dilaurate (0.1 parts) and methoxypropyl acetate (102.25 parts) were added to a round bottom flask and heated with agitation to 70° C. under a nitrogen atmosphere. Tolylene diisocyanate (18.57 parts) was added drop wise over a period of 30 minutes maintaining the temperature at 70-75° C. The reaction was allowed to continue at this temperature for a further 4 hours when only a trace of isocyanate remained. Di-tert-butyl-4-methylphenol (0.01 parts) was then added. Solids content was 49 wt. % (Mn=11,800 and Mw=41,100).

Dispersant 8

Intermediate A (32.64 parts), cyclohexane dimethanol (5.07 parts), caprolactone 2-(methacryloyloxyethyl)ester (2.61 parts), dibutyltin dilaurate (0.05 parts) and methoxypropyl acetate (50.61 parts) were added to a round bottom flask and heated with agitation to 70° C. under a nitrogen atmosphere. Tolylene diisocyanate (10.24 parts) was added drop wise over a period of 30 minutes maintaining the temperature at 70-75° C. The reaction was allowed to continue at this temperature for a further 4 hours when only a trace of isocyanate remained. Solids content was 50 wt. % (Mn=7,800 and Mw=26,700).

Dispersant 9

Intermediate A (19.72 parts), N-methyldiethanolamine (2.85 parts), hydroxyethyl methacrylate (0.46 parts), dibutyltin dilaurate (0.03 parts) and methoxypropyl acetate (29.46 parts) were added to a round bottom flask and heated with agitation to 70° C. under a nitrogen atmosphere. Tolylene diisocyanate (6.40 parts) was added drop wise over a period of 30 minutes maintaining the temperature at 70-75° C. The reaction was allowed to continue at this temperature for a further 4 hours when only a trace of isocyanate remained. Solids content was 50 wt. % (Mn=5,300 and Mw=12,200).

Dispersant 10

Tolylene diisocyanate (49.75 parts) was added to a round bottom flask under a nitrogen atmosphere. With agitation, intermediate B (192.40 parts), hexane diol (9.29 parts), N-methyldiethanolamine (8.16 parts), hydroxyethyl methacrylate (12.39 parts) and di-tert-butyl-4-methylphenol (0.15 parts) were added over a period of 30 minutes and the contents exothermed to 50-55° C. The reaction was heated to 70-75° C. for a further 1.5 hours. Dibutyltin dilaurate (0.3 parts) was then added and the contents maintained at 70-75° C. for 20 hours. Hydroxyethyl methacrylate (1.2 parts) was then added and the polymerisation maintained at 70-75° C. for 30 minutes when only a trace of isocyanate remained. (Mn=6,400 and Mw=18,000).

Dispersant 11

Tolylene diisocyanate (19.42 parts) was added to a round bottom flask under a nitrogen atmosphere. With agitation, intermediate C (74 parts), N-methyldiethanolamine (6.58 parts), hydroxyethyl acrylate (4.32 parts) and di-tert-butyl-4-methylphenol (0.05 parts) were added over a period of 30 minutes and the contents exothermed to 50-55° C. The reaction was heated to 70-75° C. for a further 4 hours until only a trace of isocyanate remained. (Mn=4,200 and Mw=15,700).

Dispersant 12

Intermediate B (228.00 parts) and 2,2-bis(hydroxymethyl) propionic acid (19.23 parts) were added to a round bottom flask with agitation under a nitrogen atmosphere. Tolylene diisocyanate (52.47 parts) was then added and the temperature exothermed to 40-45° C. Hydroxyethyl methacrylate (13.07 parts), dibutyltin dilaurate (0.3 parts) and di-tert-butyl-4-methylphenol (0.16 parts) were then added and the contents heated to 70-75° C. The reaction was maintained at 70-75° C. for 20 hrs until no isocyanate remained. (Mn=8,400 and Mw=17,300).

Dispersant 13

Intermediate B (60.0 parts), 2,2-bis(hydroxymethyl)propionic acid (3.0 parts), hexane diol (10.37 parts), Intermediate D (40.16 parts), dibutyltin dilaurate (0.1 parts), di-tert-butyl-4-methylphenol (0.14 parts) and methoxypropyl acetate (140.16 parts) were added to a round bottom flask and heated with agitation to 70° C. under a nitrogen atmosphere. Tolylene diisocyanate (26.53 parts) was added drop wise over a period of 30 minutes maintaining the temperature at 70-75° C. The reaction was allowed to continue at this temperature for a further 20 hours when only a trace of isocyanate remained. (Mn=6,900 and Mw=24,500).

Dispersant 14

Intermediate F (71.0 parts), N-methyldiethanolamine (3.0 parts), hexane diol (5.41 parts), Intermediate E (18.14 parts), dibutyltin dilaurate (0.1 parts), di-tert-butyl-4-methylphenol (0.1 parts) and ethyl acetate (118.14 parts) were added to a round bottom flask and heated with agitation to 70° C. under a nitrogen atmosphere. Tolylene diisocyanate (20.49 parts) was added drop wise over a period of 30 minutes maintaining the temperature at 70-75° C. The reaction was allowed to continue at this temperature for a further 3 hours when only a trace of isocyanate remained. Solids content was 55 wt. % (Mn=6,700 and Mw=22,000).

Dispersant 15

Intermediate F (60.0 parts), hexane diol (11.79 parts), Intermediate D (78.0 parts), dibutyltin dilaurate (0.1 parts), di-tert-butyl-4-methylphenol (0.18 parts) and butyl acetate (178.0 parts) were added to a round bottom flask and heated with agitation to 70° C. under a nitrogen atmosphere. Tolylene diisocyanate (28.11 parts) was added drop wise over a period of 30 minutes maintaining the temperature at 70-75° C. The reaction was allowed to continue at this temperature for a further 3 hours when only a trace of isocyanate remained. Solids content was 50 wt. % (Mn=5,200 and Mw=9,200).

Dispersant 16

Intermediate C (60.0 parts), N-methyldiethanolamine (8.0 parts), hexane diol (4.15 parts), Intermediate G (76.31 parts), di-tert-butyl-4-methylphenol (0.1 parts) were added to a round bottom flask and heated with agitation to 70° C. under a nitrogen atmosphere. Tolylene diisocyanate (27.75 parts) was added drop wise over a period of 30 minutes maintaining the temperature at 70-75° C. The reaction was allowed to continue at this temperature for a further 2 hours when only a trace of isocyanate remained. (Mn=7,300 and Mw=19,800).

Dispersant 17

Intermediate H (126.14 parts), 2,2-bis(hydroxymethyl) propionic acid (4.1 parts), hexane diol (4.0 parts), hydroxyethyl methacrylate (7.86 parts), di-tert-butyl-4-methylphenol (0.05 parts), dibutyltin dilaurate (0.1 parts) and ethyl acetate (50.8) were added to a round bottom flask and heated with agitation to 70° C. under a nitrogen atmosphere. Tolylene diisocyanate (22.80 parts) was added drop wise over a period of 30 minutes maintaining the temperature at 70-75° C. The reaction was allowed to continue at this temperature for a further 20 hours when only a trace of isocyanate remained. The majority of solvent was then removed on a rotary evaporator. The material was transferred to a metal tray and the product further dried in a vacuum oven. (Mn=1600 and Mw=10,600).

Dispersant 18

Tolylene diisocyanate (52.19 parts) was added to a round bottom flask under a nitrogen atmosphere. With agitation, intermediate B (210 parts), 1,1'-{[3-(dimethylamino)-propyl]imino}bis-2-propanol (37.81 parts), hydroxyethyl acrylate (6.33 parts) and di-tert-butyl-4-methylphenol (0.31 parts) were added over a period of 30 minutes and the contents exothermed to 50-55° C. The reaction was heated to 70-75° C. for a further 4 hours until only a trace of isocyanate remained. Solids content was 52.0 wt. % (Mn=6,700 and Mw=20,900).

Dispersant 19

Dispersant 18 (300 parts) was added to a round bottom flask and heated to 70° C. under nitrogen with agitation. Benzyl chloride (9.4 parts) and methoxypropyl acetate (9.4 parts) was then added and the reaction maintained at 70° C. for 20 hours. The product was a viscous liquid. Solids content was 53.0 wt. %.

Dispersant 20

Tolylene diisocyanate (26.48 parts) was added to a round bottom flask under a nitrogen atmosphere. With agitation, intermediate C (105 parts), 1,1'-{[3-(dimethylamino)-propyl]imino}bis-2-propanol (18.52 parts) and hydroxyethyl methacrylate (3.6 parts) were added over a period of 30 minutes and the contents exothermed to 50-55° C. The reaction was heated to 70-75° C. for a further 4 hours until only a trace of isocyanate remained. (Mn=5,500 and Mw=22,400).

Dispersant 21

Hexanediol (13.9 parts), Intermediate B (207.0 parts), 2,2-bis(hydroxymethyl)propionic acid (15.45 parts), hydroxyethyl methacrylate (8.61 parts), butylated hydroxytoluene (0.001 parts) and methoxypropyl acetate (308.6 parts) were stirred under air at ca. 23° C. Dibutyltin dilaurate (0.30 parts) was then added. Tolylene diisocyanate (63.35 parts) charged to the reaction mixture over ca. 5 mins. resulting in a small exotherm. The reaction mixture was then heated to 70-72° C. and stirred under air for a further 20.5 hours until only a slight trace of isocyanate remained by infra red analysis. Solids content was 50.8 wt. % (Mn=6,900 and Mw=21,400).

Dispersant 22

Hexanediol (13.08 parts), Intermediate A (414.0 parts, 50 wt % solution in methoxypropyl acetate), 2,2-bis(hydroxymethyl)propionic acid (15.45 parts), hydroxyethyl acrylate (7.78 parts), Butylated hydroxytoluene (0.001 parts) and methoxypropyl acetate (100.8 parts) were stirred under air at ca. 24° C. Dibutyltin dilaurate (0.30 parts) was then added. Tolylene diisocyanate (64.17 parts) was charged to the reaction mixture over ca. 18 mins. resulting in an exotherm to 56° C. The reaction mixture was then heated to 70-73° C. and stirred under air for a further ca. 19.3 hours until no isocyanate remained by infra red analysis. Solids content was 49.6 wt. % (Mn=4,200 and Mw=13,200).

Dispersant 23

Hexanediol (12.03 parts), Intermediate A (414.0 parts 50 wt. % solution in methoxypropyl acetate), NMDA (15.45 parts), hydroxyethyl methacrylate (8.86 parts), butylated hydroxytoluene (0.001 parts) and methoxypropyl acetate (101.9 parts) were stirred under air at ca. 22° C. Dibutyltin dilaurate (0.30 parts) was then added. Tolylene diisocyanate (65.22 parts) was charged to the reaction mixture over ca. 8 mins. resulting in an exotherm to 54° C. The reaction mixture was then heated to 70-73° C. and stirred under air for a further ca. 3 hours until no isocyanate remained by infra red analysis. Solids content was 48.8 wt. % (Mn=7,200 and Mw=22,500).

Dispersant 24

Cyclohexane dimethanol (1.76 parts), Intermediate B (93.78 parts), 2,2-bis(hydroxymethyl)propionic acid (5.35 parts), hydroxyethyl acrylate (2.49 parts), trimethylolpropane (0.97 parts) and ethyl acetate (125 parts) were stirred under nitrogen at 70° C. Dibutyltin dilaurate (0.098 parts) was then added. Tolylene diisocyanate (20.55 parts) charged to the reaction mixture over 30 minutes. The reaction mixture was stirred under nitrogen for a further 25.5 hours at 70° C. until no isocyanate remained. Solids content was 53.0 wt. % (Mn=12,500 and Mw=31,000).

Dispersant 25

Cyclohexane dimethanol (2.73 parts), Intermediate B (145.51 parts), 2,2-bis(hydroxymethyl)propionic acid (8.3 parts), hydroxyethyl acrylate (2.70 parts), pentaerythritol triacrylate (9.93 parts), trimethylolpropane (1.50 parts) and ethyl acetate (185 parts) were stirred under nitrogen at 70° C. Dibutyltin dilaurate (0.15 parts) was then added. Tolylene diisocyanate (20.55 parts) charged to the reaction mixture over 30 minutes. The reaction mixture was stirred under nitrogen for a further 25.5 hours at 70° C. until no isocyanate remained. Solids content was 53.0 wt. % (Mn=15,700 and Mw=42,600).

Pigment Dispersion Performance Dispersion of Carbon Black in Styrene Dispersion Formulation CB1

A dispersion was prepared by dissolving dispersant (1.0 parts) and di-tert-butyl-4-methylphenol (0.05 parts) in styrene (5.5 parts). 3 mm glass beads (17 parts) and black pigment (3.5 parts, Raven 1200, ex Columbian Chemicals Company) were added and the contents milled on a horizontal shaker for 16 hrs.

Dispersion Formulation CB2a

A dispersion was prepared by dissolving dispersant (1.0 parts ca. 50 wt % in solvent) in styrene (5.5 parts). 3 mm glass beads (17 parts) and black pigment (3.5 parts, Raven 1200, ex Columbian Chemicals Company) were added and the contents milled on a horizontal shaker for 16 hrs.

Dispersion Formulation CB2b

A dispersion was prepared by dissolving dispersant (2.0 parts ca. 50 wt. % in solvent) in styrene (4.5 parts). 3 mm glass beads (17 parts) and black pigment (3.5 parts, Raven 1200, ex Columbian Chemicals Company) were added and the contents milled on a horizontal shaker for 16 hrs.

Dispersion Formulation CB3

A dispersion was prepared by dissolving dispersant (1.4 parts 100% active) in styrene (19.6 parts). 3 mm glass beads (125 parts) and black pigment (14.0 parts, Raven 1200, ex Columbian Chemicals Company) were added and the contents milled on a Red Devil shaker for 1 hr.

Dispersion Formulation CB4a

A dispersion was prepared by dissolving dispersant (3.26 parts 100% active) in styrene (18.14 parts). 3 mm glass beads (125 parts) and black pigment (13.6 parts, Raven 1200, ex Columbian Chemicals Company) were added and the contents milled on a Red Devil shaker for 1 hr.

Dispersion Formulation CB4b

A dispersion was prepared by dissolving dispersant (6.52 parts ca. 50 wt. % in solvent) in styrene (15.15 parts). 3 mm glass beads (125 parts) and black pigment (13.6 parts, Raven 1200, ex Columbian Chemicals Company) were added and the contents milled on a Red Devil shaker for 1 hr.

Summary of Dispersion Performance

In the absence of a dispersant in the formulations, formed a thick inhomogeneous immovable gel with regions in which the pigment was not wetted.

In the presence of dispersants, the pigment milled to form a paste. The viscosity of the paste has been determined in the table below by determining the freedom of the glass beads to move throughout the mill base. In all cases the pigment was wetted out and a homogeneous dispersion formed.

Viscosity Grading
A=Very Fluid
B=Fluid
C=Viscous

Table 2 to Show Performance of Dispersants 6-20

| Carbon Black Dispersion | Dispersant | Dispersion Formulation Used | Viscosity of Dispersion |
|---|---|---|---|
| D6 | 6 | CB2a | B |
| D7 | 7 | CB2b | B |
| D8 | 8 | CB2a | A |
| D9 | 9 | CB1 | B |
| D10 | 10 | CB3 | C |
| D11 | 11 | CB4a | A |
| D12 | 12 | CB3 | C |
| D13 | 13 | CB4b | A |
| D14 | 14 | CB4b | A |
| D15 | 15 | CB4b | C |
| D16 | 16 | CB4a | B |
| D17 | 17 | CB4a | A |
| D18 | 18 | CB4b | C |
| D19 | 19 | CB4b | C |
| D20 | 20 | CB4a | C |
| D21 | 21 | CB2b | A |
| D22 | 22 | CB2b | A |
| D23 | 23 | CB2b | A |

For dispersion D17, the viscosity of the dispersion was measured on a TA Instruments AR2000 Rheometer. Approximately 1 ml of the dispersion was applied to the peltier plate and the measuring geometry (a 40 mm 2° steel cone) was then lowered onto the sample. A shear rate sweep of 0.04 to 2000 $s^{-1}$ was then applied to the sample whilst maintaining a constant temperature of 25° C. The viscosity of the dispersion was as shown in the following table.

TABLE 3

| Dispersion | Viscosity/Pa · s (shear rate 1 $s^{-1}$) | Viscosity/Pa · s (shear rate 1000 $s^{-1}$) |
|---|---|---|
| D17 | 0.6 | 0.1 |

Testing in a UV Cure Formulation.

The presence of reactive double bonds in the dispersant has been shown to have a beneficial effect in a model UV curing system.

Comparison was made between a formulation containing dispersant 1 of this invention and comparative dispersant a with a similar composition except that it does not contain reactive double bonds. Formulations UV1 and UVα were prepared from the following materials.

TABLE 4

|  | UV1 Parts by weight | UVα Parts by weight |
|---|---|---|
| Tripropylene glycol diacrylate | 9.00 | 9.00 |
| Dispersant 1 | 1.00 | — |
| Comparative dispersant α | — | 1.00 |
| Tegorad 2250[1] | 0.40 | 0.40 |
| Irgacure 819[2] | 3.30 | 3.30 |
| Darocure 1173[2] | 6.70 | 6.70 |

[1]Supplied by Tego Chemie
[2]Supplied by Ciba Specialty Chemicals

Films were of UV1 and UVα were drawn down onto glass panels using a K bar number 0. The coated panels were cured in a Fusion Systems UV apparatus by being passed under 10" long D bulb (with a power rating of 120 watts/cm) at a speed of ca. 40 m/min.

After 7 passes under the lamp the film from formulation UV1 had a Koenig hardness of 31 seconds. The comparative coating from formulation UVα only had a Koenig hardness of 24 seconds.

Another film coated similarly from formulation UV1 achieved a Koenig hardness of 26 seconds after five passes under the UV lamp.

These observations demonstrate that coating from UV1 produced of a harder film after an equivalent cure time or a required a shorter cure time to achieve the same hardness relative to the formulation containing the comparative dispersant α without reactive double bonds.

Blue UV Ink Formulations

Dispersions were prepared by adding the materials detailed in the following table to a 4 oz. glass jar in the order listed.

TABLE 5

UV Ink Color Dispersion Formulation (blue)

|  | With No Dispersant Comparative | Dispersant 1 | Dispersant 21 | Dispersant 22 | Dispersant 23 |
|---|---|---|---|---|---|
| Heliogen Blue D7080[1] | 7.00 | 7.00 | 7.00 | 7.00 | 7.00 |
| Dispersant 1 |  | 8.40 |  |  |  |
| Dispersant 21 |  |  | 8.27 |  |  |
| Dispersant 22 |  |  |  | 8.47 |  |
| Dispersant 23 |  |  |  |  | 8.61 |
| Solsperse 5000[2] |  | 0.77 | 0.77 | 0.77 | 0.77 |
| Tripropyleneglycol diacrylate | 40.00 | 30.80 | 30.93 | 30.73 | 30.59 |
| TOTAL | 46.97 | 46.97 | 46.97 | 46.97 | 46.97 |

[1]Supplied by BASF
[2]Supplied by Noveon

The mixture was gently stirred to wet out the pigment. 125 parts of 3 mm diameter glass beads were added to the jar. The jar was placed in a Scandex disperser model 200-K and the contents milled by oscillatory shaking for 4 hours.

Blue UV inks were then prepared by adding 3.21 parts of each of the dispersions to a mixture of the following components.

TABLE 6

UV Ink Formulations from the above Dispersions

|  | Parts by weight |
|---|---|
| Ebecryl 160[1] | 3.50 |
| Ebecryl 83[1] | 2.75 |
| Tegorad 2250[2] | 0.10 |
| Irgacure 819[3] | 0.83 |
| Darocure 1173[3] | 1.68 |
| Tripropyleneglycol diacrylate | 3.25 |
| isobornyl acrylate | 10.10 |

[1]Supplied by UCB Chemicals
[2]Tego Chemie
[3]Supplied by Ciba Specialty Chemicals.

The resulting inks were drawn down onto Leneta black and white card using an automatic film applicator fitted with a number 0 K bar. The coatings were cured in a Fusion Systems UV apparatus by being passed 4 times under 10" long D bulb (with a power rating of 120 watts/cm) at a speed of ca. 40 m/min.

The gloss and haze of the coatings were measured with a gloss and haze meter. The ink containing dispersants produced a glossier coatings with much higher color strength than the comparative ink without a dispersant present.

TABLE 7

Data on Gloss, Haze and Strength of Blue UV Ink Formulations

|  | Gloss 20° | Haze | Strength (%) |
|---|---|---|---|
| Blue ink no dispersant from UV blue comparative | 66.5 | 78.5 | 100 |
| Blue ink from dispersion UV blue 1 | 72.2 | 45.9 | 197.7 |
| Blue ink from dispersion UV blue 21 | 73.3 | 49.4 | 196.7 |
| Blue ink from dispersion UV blue 22 | 75.7 | 47.3 | 201.6 |
| Blue ink from dispersion UV blue 23 | 73.8 | 44.7 | 203.2 |

Yellow UV Ink Formulations

Dispersions were prepared by adding the materials detailed in the following table 8 to a 4 oz. glass jar in the order listed.

TABLE 8

UV Yellow Ink Dispersions, Comparative and Dispersants 1, 21, 22, and 23

|  | Comparative | Dispersant 1 | Dispersant 21 | Dispersant 22 | Dispersant 23 |
|---|---|---|---|---|---|
| Ink Jet Yellow 4G VP 2532[1] | 6.80 | 6.80 | 6.80 | 6.80 | 6.80 |
| Dispersant 1 |  | 5.44 |  |  |  |
| Dispersant 21 |  |  | 5.35 |  |  |
| Dispersant 22 |  |  |  | 5.48 |  |
| Dispersant 23 |  |  |  |  | 5.57 |
| Tripropyleneglycol diacrylate | 38.16 | 32.28 | 32.37 | 32.24 | 32.15 |
| TOTAL | 44.96 | 44.96 | 44.96 | 44.96 | 44.96 |

[1]Supplied by Clariant

The mixture was gently stirred to wet out the pigment. 125 parts of 3 mm diameter glass beads were added to the jar. The jar was placed in a Scandex disperser model 200-K and the contents milled by oscillatory shaking for 4 hours.

Yellow UV inks were then prepared by adding 3.21 parts of each of the dispersions to a mixture of the following components.

TABLE 9

Yellow UV Ink Formulations

| | Parts by weight |
|---|---|
| Ebecryl 160[1] | 3.50 |
| Ebecryl 83[1] | 2.75 |
| Tegorad 2250[2] | 0.10 |
| Irgacure 819[3] | 0.83 |
| Darocure 1173[3] | 1.68 |
| Tripropyleneglycol diacrylate | 3.25 |
| isobornyl acrylate | 10.10 |

[1]Supplied by UCB Chemicals
[2]Tego Chemie
[3]Supplied by Ciba Specialty Chemicals.

The resulting inks were drawn down onto Leneta black and white card using an automatic film applicator fitted with a number 0 K bar. The coatings were cured in a Fusion Systems UV apparatus by being passed 4 times under 10" long D bulb (with a power rating of 120 watts/cm) at a speed of ca. 40 m/min.

The gloss and haze of the coatings were measured with a gloss and haze meter. The ink containing dispersants produced a glossier coatings with higher color strength than the comparative ink without a dispersant present.

TABLE 10

Data on Gloss, Haze and Strength of Yellow UV Ink Formulations

| | Gloss 20° | Haze | Strength (%) |
|---|---|---|---|
| Yellow ink no dispersant from dispersion UV yellow comparative | 68.3 | 79.4 | 100 |
| Yellow ink from dispersion UV yellow 1 | 76.2 | 51.3 | 110.3 |
| Yellow ink from dispersion UV yellow 21 | 75.6 | 56.0 | 115.0 |
| Yellow ink from dispersion UV yellow 22 | 81.0 | 56.6 | 126.2 |
| Yellow ink from dispersion UV yellow 23 | 87.1 | 60.9 | 131.8 |

INDUSTRIAL APPLICATION

Dispersions and mill bases made from the composition of the invention are particularly suitable for use in paints, including high solids paints, solvent based inks, especially flexographic, gravure, and screen inks, uv cure inks, color filter layers for display screen equipment, thermosetting resin compositions such as sheet molding compounds, bulk molding compounds or gel coats and non-aqueous ceramic processes.

The dispersants may also be used for dispersing particulate matter including pigments in powder coating formulations particularly powder coatings which are to be cured by radiation curing.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements. As used herein, the expression "consisting essentially of" permits the inclusion of substances that do not materially affect the basic and novel characteristics of the composition under consideration.

While the invention has been explained in relation to its preferred embodiments, it is to be understood that various modifications thereof will become apparent to those skilled in the art upon reading the disclosure. Therefore, it is to be understood that the invention disclosed herein is intended to cover such modifications as fall within the scope of the appended claims.

The invention claimed is:

1. A polyurethane dispersant comprising a polyurethane backbone and laterally attached solvent-solubilizing: a) polyether chains of poly($C_{2-4}$-alkylene oxide), b) polyester chains, c) polyacrylic chains, or d) polyolefin chains, or mixtures thereof; and optionally one or more chain terminators wherein on average each dispersant molecule has at least one reactive carbon to carbon double bond in the backbone, the laterally attached solvent solubilizing chains, or the chain terminators, or combinations thereof, further comprising a nitrogen in a non-reactive amine (non-reactive with respect to isocyanates) laterally attached to the polyurethane backbone such that said nitrogen atom is separated by at least two atoms from the closest atom on the backbone and wherein the non-reactive amine is derived from the chemical group consisting of N,N-bis(2-hydroxyethyl)isonicotinamide; 1,1'-{[3-(dimethylamino)-propyl]imino}bis-2-propanol; or the compound

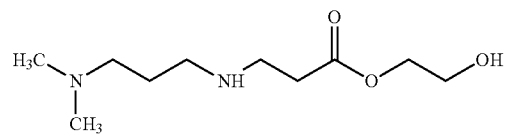

formed from the Michael addition of dimethylaminopropylamine and 2-hydroxyethyl acrylate and wherein said non-reactive amine is a tertiary amine, a quaternary ammonium salt, or combinations thereof.

2. The polyurethane dispersant of claim 1 wherein the polyester, polyether polyacrylate and polyolefin solvent-solubilizing chains contain a terminating $C_{1-50}$-hydrocarbyl group, optionally containing a reactive carbon to carbon double bond.

3. The polyurethane dispersant of claim 1 wherein the each dispersant molecule on average comprises at least one solvent-solubilizing poly($C_{2-4}$-alkylene oxide) (polyether) chain.

4. The polyurethane dispersant of claim 3 wherein the poly($C_{2-4}$-alkylene oxide) chain is the residue of a polyether which contains two hydroxyl groups at one end of the polyether chain which react with isocyanates and which hydroxyl groups are separated by not less than 5 atoms.

5. The polyurethane dispersant of claim 1 wherein the polyester solvent-solubilizing chain is the residue of a polyester which contains two hydroxyl groups at one end of the polyester chain which react with isocyanates and which hydroxyl groups are separated by from 5 to 17 atoms.

6. The polyurethane dispersant of claim 1, wherein the solvent-solubilizing polyether chain contains the residue of a compound of formula 1

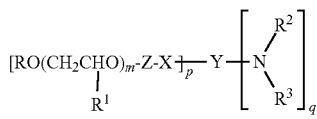

wherein
R is $C_{1-20}$-hydrocarbyl group;
$R^1$ is hydrogen, methyl or ethyl of which less than 60% is hydrogen;
$R^2$ and $R^3$ are each, independently, $C_{1-8}$-hydroxyalkyl;
Z is $C_{2-4}$-alkylene;
X is —O— or —NH—;
Y is the residue of a polyisocyanate;
m is from 5 to 150;
p is from 1 to 4; and
q is 1 or 2.

7. The polyurethane dispersant according to claim 1 wherein the solvent-solubilizing polyether chain contains the residue of a compound of formula 2

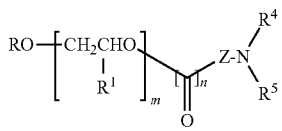

wherein
R is $C_{1-20}$-hydrocarbyl group;
$R^1$ is hydrogen, methyl or ethyl of which less than 60% is hydrogen;
$R^4$ is an isocyanate reactive organic radical;
$R^5$ is hydrogen or an isocyanate-reactive organic radical;
Z is $C_{2-4}$-alkylene
m is from 5 to 150; and
n is 0 to 1.

8. The polyurethane dispersant of claim 1 wherein the solvent-solubilizing polyether chain contains the residue of a compound of formula 3

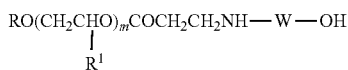

wherein
R is $C_{1-20}$-hydrocarbyl group;
$R^1$ is hydrogen, methyl or ethyl of which less than 60% is hydrogen;
W is $C_{2-6}$-alkylene; and
m is from 5 to 150.

9. The polyurethane dispersant of claim 1 wherein the solvent-solubilizing polyester side chain is the residue of a compound of formula 6

$$R^9O((O)C\text{-}A\text{-}O)_mH \qquad 6$$

wherein
$R^9$ is $C_{1-50}$-hydrocarbyl group;
A is $C_{1-26}$-alkylene and/or $C_{2-26}$-alkenylene; and
m is from 5 to 150.

10. The polyurethane dispersant according to claim 1 comprising a polyurethane backbone and at least one attached solvent-solubilizing polyester side chain.

11. The polyurethane dispersant as claimed in claim 10 wherein said solvent solubilizing polyester side chain is obtained from a hydroxy carboxylic acid or lactone thereof containing from 1 to 26 carbon atoms, including mixtures thereof.

12. The polyurethane dispersant of claim 11 wherein said solvent solubilizing polyester side chain is obtained from the lactone and said lactone comprises ε-caprolactone or δ-valerolactone.

13. The polyurethane dispersant of claim 10 wherein the polyurethane dispersant has polyurethane backbone and attached solvent-solubilizing polyacrylate which further comprises from 10 to 180 milliequivalents of an acid or amino group, including salts thereof for each 100 g dispersant.

14. The polyurethane dispersant of claim 1, wherein said dispersant has a polyurethane backbone portion that is linear as opposed to the polyurethane backbone portion being branched or non-linear and said solvent-solubilizing chains are laterally attached.

15. The polyurethane dispersant of claim 1, wherein said dispersant has a polyurethane backbone portion that is essentially non-linear meaning that the polyurethane backbone contains branches either derived from isocyanate reactants that have more than two isocyanate groups and/or reactants with Zerewitinoff active hydrogen groups that have higher functionality than two when reacted with isocyanates.

16. The polyurethane dispersant of claim 1 wherein the number-average molecular weight of the polyester, polyether, polyacrylate or polyolefin solvent-solubilizing chain is from 300 to 10,000.

17. The polyurethane dispersant as claimed in claim 1 wherein the total weight percentage of solvent-solubilizing chains is not less than 5% based on the total weight of the dispersant.

18. A polyurethane dispersant according to claim 1 wherein the non-reactive amine comprises a quaternary ammonium salt.

* * * * *